United States Patent
Kadoi

(10) Patent No.: US 11,032,468 B2
(45) Date of Patent: Jun. 8, 2021

(54) IMAGE PROCESSING APPARATUS, IMAGE PROCESSING METHOD, IMAGE CAPTURING APPARATUS, AND STORAGE MEDIUM

(71) Applicant: CANON KABUSHIKI KAISHA, Tokyo (JP)

(72) Inventor: Hideki Kadoi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 16/229,063

(22) Filed: Dec. 21, 2018

(65) Prior Publication Data

US 2019/0199916 A1 Jun. 27, 2019

(30) Foreign Application Priority Data

Dec. 26, 2017 (JP) .............................. JP2017-250103
Oct. 29, 2018 (JP) .............................. JP2018-203254

(51) Int. Cl.
*H04N 5/232* (2006.01)
*G06K 9/64* (2006.01)
*H04N 1/21* (2006.01)

(52) U.S. Cl.
CPC ........... *H04N 5/23222* (2013.01); *G06K 9/64* (2013.01); *H04N 1/2112* (2013.01); *H04N 2201/0084* (2013.01)

(58) Field of Classification Search
CPC ........... H04N 5/23222; H04N 5/23299; H04N 1/2112; H04N 5/23203; G06K 9/62; G06K 9/64; G06K 9/66; G06K 9/00228; G06K 9/00624; G06K 9/6227
See application file for complete search history.

(56) References Cited

U.S. PATENT DOCUMENTS

| 2008/0298795 | A1* | 12/2008 | Kuberka ................ H04N 7/188 396/263 |
| 2017/0155833 | A1* | 6/2017 | Rodrigo Cavalin ......................... H04N 5/23222 |
| 2017/0208245 | A1* | 7/2017 | Castillo .............. H04N 5/23293 |
| 2018/0365856 | A1* | 12/2018 | Parasnis ................... G06T 7/80 |
| 2019/0102608 | A1* | 4/2019 | Wang .................. H04N 5/23219 |
| 2019/0199919 | A1* | 6/2019 | Systrom ............. H04N 21/2187 |

FOREIGN PATENT DOCUMENTS

JP 2016-536868 A 11/2016
WO 2015/055655 A1 4/2015

* cited by examiner

*Primary Examiner* — Kelly L Jerabek
(74) *Attorney, Agent, or Firm* — Cowan, Liebowitz & Latman, P.C.

(57) ABSTRACT

An image processing method includes the steps of performing processing of selecting a learning model from a plurality of learning models that have learned a reference used to record an image generated by an image sensor; performing, using the selected learning model, determination processing of determining whether the image generated by the image sensor satisfies the reference; and recording the image in a case in which it is determined that the image generated by the image sensor satisfies the reference, wherein the processing of selecting the learning model is performed based on at least one of an image capturing instruction by a user, an evaluation result of the image by the user, an environment when the image is generated, and a score of each of the learning models for the image generated by the image sensor.

18 Claims, 15 Drawing Sheets

IMAGE PROCESSING APPARATUS, IMAGE PROCESSING METHOD, IMAGE CAPTURING APPARATUS, AND STORAGE MEDIUM

BACKGROUND OF THE INVENTION

Field of the Invention

The present invention relates to an automatic image capturing technology in an image capturing apparatus.

Description of the Related Art

In still image/moving image capturing by an image capturing apparatus such as a camera, normally, a user decides a subject to be imaged through a viewfinder or the like, confirms the image capturing state by himself/herself, and adjusts the framing of a captured image, thereby capturing an image. Such an image capturing apparatus has a function of detecting an operation error of the user and notifying the user of it or detecting the external environment and, if the environment is not suitable for image capturing, notifying the user of it. In addition, there conventionally exists a mechanism for controlling the camera to obtain a state suitable for image capturing.

In addition to the image capturing apparatus that executes image capturing by a user operation, there exists a life-log camera that periodically and continuously performs image capturing without an image capturing instruction given by a user (Japanese Patent Laid-Open No. 2016-536868). The life-log camera is used in a state in which a user wears it on the body using a strap or the like, and records a scene that the user sees in a daily life as a video at a predetermined time interval. Since image capturing by the life-log camera is performed not at an intended timing such as shutter release by the user but at a predetermined time interval, an unexpected moment that is not captured usually can be recorded as a video.

However, if automatic image capturing is periodically performed in a state in which the user wears the life-log camera, in some cases, a video unwanted by the user is acquired, and a video of an actually desired moment cannot be acquired.

In addition, even if the life-log camera has a learning function, and can learn a moment the user actually wants to capture and perform automatic image capturing, the user's preference may change each time, or the situation at the time may change, and the object or moment to capture may change.

This is because a human's preference is not simple. For example, a user may "want to take a photo of many people making much noise" one day but "want to capture a situation in which he/she is quietly spending time alone" next day. That is, contrary preferences sometimes occur in the same human. In addition, a scene a user wants to capture in a daily life and a scene he/she wants to capture in a special event (for example, a wedding ceremony) may be different. That is, the preference may change between different situations. To perform image capturing meeting the user's intention, it is necessary to follow a change in the mood or situation at that time.

SUMMARY OF THE INVENTION

The present invention has been made in consideration of the above-described problem, and provides an image capturing apparatus capable of acquiring a video suitable for a user without performing a special operation by the user.

According to a first aspect of the present invention, there is provided an image processing method comprising: performing processing of selecting a learning model from a plurality of learning models that have learned a reference used to record an image generated by an image sensor; performing, using the selected learning model, determination processing of determining whether the image generated by the image sensor satisfies the reference; and recording the image generated by the image sensor in a memory in a case in which it is determined in the determination processing that the image generated by the image sensor satisfies the reference, wherein the processing of selecting the learning model is performed based on at least one of an image capturing instruction by a user, an evaluation result of the image by the user, an environment when the image is generated by the image sensor, and a score of each of the plurality of learning models for the image generated by the image sensor.

According to a second aspect of the present invention, there is provided an image processing apparatus comprising: a processor; and a memory including instructions that, when executed by the processor, cause the processor to: select a learning model from a plurality of learning models that have learned a reference used to record an image generated by an image sensor; perform, using the selected learning model, determination processing of determining whether the image generated by the image sensor satisfies the reference; and record the image generated by the image sensor in a memory in a case in which it is determined in the determination processing that the image generated by the image sensor satisfies the reference, wherein the processor selects the learning model from the plurality of learning models based on at least one of an image capturing instruction by a user, an evaluation result of the image by the user, an environment when the image is generated by the image sensor, and a score of each of the plurality of learning models for the image generated by the image sensor.

According to a third aspect of the present invention, there is provided an image capturing apparatus comprising: an image sensor; a processor; and a memory including instructions that, when executed by the processor, cause the processor to: select a learning model from a plurality of learning models that have learned a reference used to record an image generated by the image sensor; perform, using the selected learning model, determination processing of determining whether the image generated by the image sensor satisfies the reference; and record the image generated by the image sensor in a memory in a case in which it is determined in the determination processing that the image generated by the image sensor satisfies the reference, wherein the processor selects the learning model from the plurality of learning models based on at least one of an image capturing instruction by a user, an evaluation result of the image by the user, an environment when the image is generated by the image sensor, and a score of each of the plurality of learning models for the image generated by the image sensor.

Further features of the present invention will become apparent from the following description of exemplary embodiments with reference to the attached drawings.

DESCRIPTION OF THE EMBODIMENTS

First Embodiment

<Arrangement of Image Capturing Apparatus>

Figure 1A:
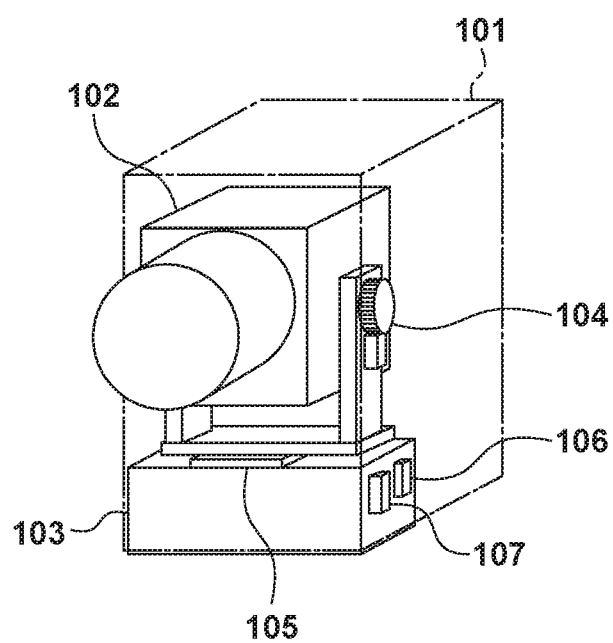
FIGS. 1A and 1B are views schematically showing an image capturing apparatus.

FIG. 1A is a view schematically showing an image capturing apparatus according to the first embodiment.

Figure 1B:
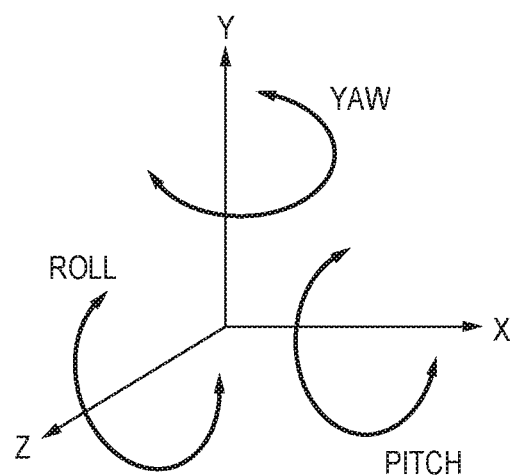

An image capturing apparatus 101 shown in FIG. 1A is provided with an operation member (to be referred to as a power button hereinafter, but the operation may be tap, flick, swipe, or the like on a touch panel) capable of performing an operation on a power switch. A lens barrel 102 that is a case including an image capturing lens group and an image sensor for performing image capturing is attached to the image capturing apparatus 101, and a rotation mechanism capable of rotationally driving the lens barrel 102 with respect to a fixed portion 103 is provided. A tilt rotation unit 104 is a motor driving mechanism capable of rotating the lens barrel 102 in a pitch direction shown in FIG. 1B, and a pan rotation unit 105 is a motor driving mechanism capable of rotating the lens barrel 102 in a yaw direction. Hence, the lens barrel 102 can rotate in one or more axial directions. FIG. 1B shows the axis definition at the position of the fixed portion 103. Both an angular velocity meter 106 and an accelerometer 107 are mounted on the fixed portion 103 of the image capturing apparatus 101. A vibration of the image capturing apparatus 101 is detected based on the angular velocity meter 106 or the accelerometer 107, and the tilt rotation unit and the pan rotation unit are rotationally driven based on the detected shaking angle. Accordingly, the shake of the lens barrel 102 that is a movable portion is corrected, or a tilt is corrected.

Figure 2:
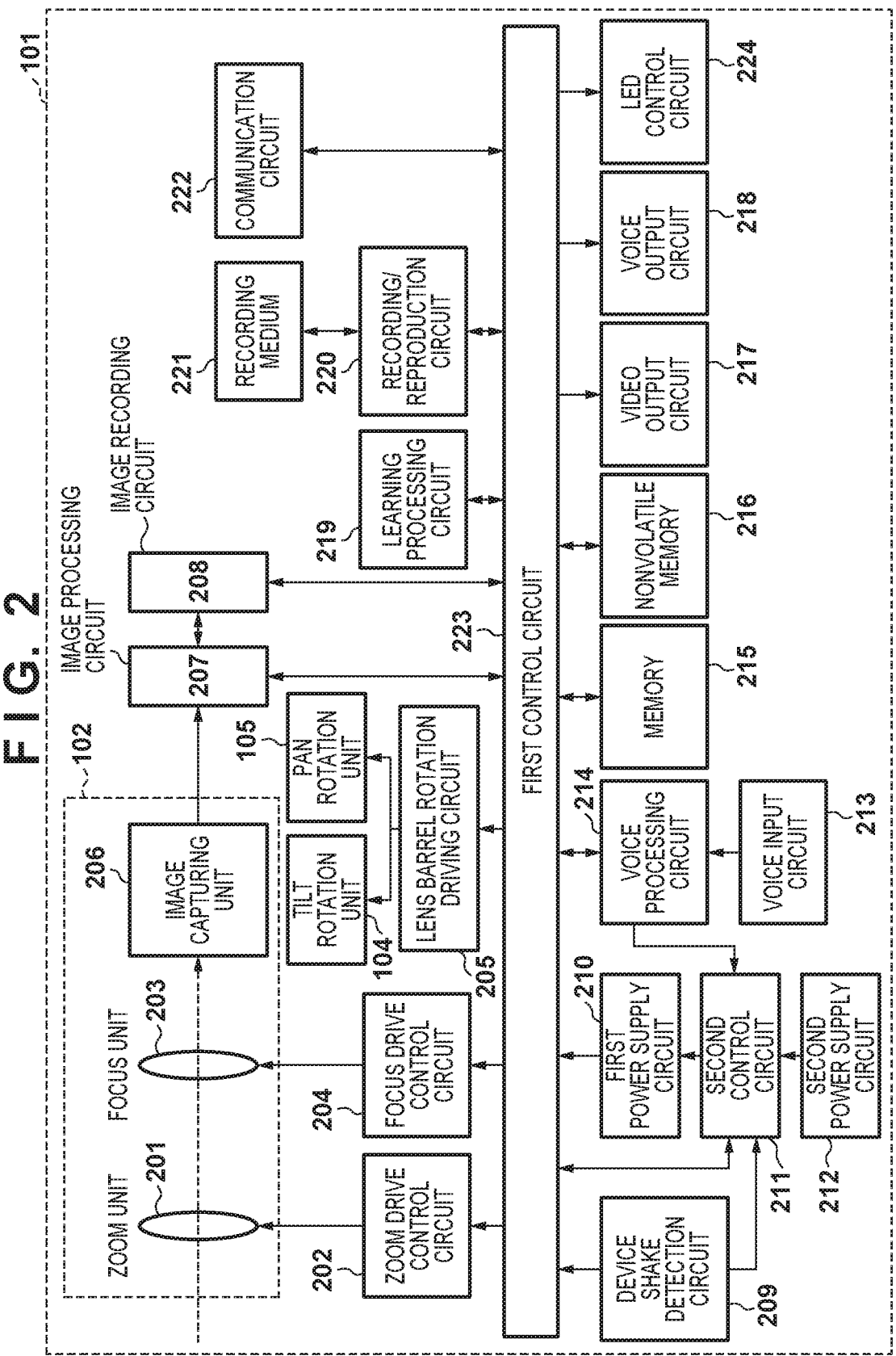
FIG. 2 is a block diagram showing the arrangement of the image capturing apparatus.

FIG. 2 is a block diagram showing the arrangement of the image capturing apparatus according to this embodiment.

Referring to FIG. 2, a first control circuit 223 is formed by a processor (for example, a CPU, a GPU, a microprocessor, an MPU, or the like) and a memory (for example, a DRAM, an SRAM, or the like). This executes various kinds of processing and controls the blocks of the image capturing apparatus 101 or controls data transfer between the blocks. A nonvolatile memory (EEPROM) 216 is an electrically erasable/recordable memory and stores constants, programs, and the like for the operation of the first control circuit 223.

Referring to FIG. 2, a zoom unit 201 includes a zoom lens that changes the power. A zoom drive control circuit 202 drives and controls the zoom unit 201. A focus unit 203 includes a lens that adjusts focus. A focus drive control circuit 204 drives and controls the focus unit 203.

An image capturing unit 206 includes an image sensor and an A/D converter. The image sensor receives light that enters via the lenses and outputs the information of charges according to the light amount as analog image data to an image processing circuit 207. The image processing circuit 207 is an arithmetic circuit including a plurality of ALUs (Arithmetic and Logic Units). The image processing circuit 207 applies image processing such as distortion correction, white balance adjustment, and color interpolation processing to digital image data output by A/D conversion, and outputs the digital image data after the application. The digital image data output from the image processing circuit 207 is converted into a record format such as JPEG by an image recording circuit 208 and transmitted to a memory 215 or a video output circuit 217 to be described later.

A lens barrel rotation driving circuit 205 drives the tilt rotation unit 104 and the pan rotation unit 105 to drive the lens barrel 102 in the tilt direction and in the pan direction.

A device shake detection circuit 209 includes, for example, the angular velocity meter (gyro sensor) 106 that detects the angular velocities in the three axial directions of the image capturing apparatus 101 and the accelerometer (acceleration sensor) 107 that detects the accelerations in the three axial directions of the apparatus. The device shake detection circuit 209 calculates the rotation angle of the apparatus and the shift amount of the apparatus based on the detected signals.

A voice input circuit 213 acquires a voice signal around the image capturing apparatus 101 from a microphone provided on the image capturing apparatus 101, performs analog-digital conversion, and transmits the voice signal to a voice processing circuit 214. The voice processing circuit 214 performs processing concerning a voice such as optimization processing of the input digital voice signal. The voice signal processed by the voice processing circuit 214 is transmitted to the memory 215 by the first control circuit 223. The memory 215 temporarily stores the image signal and the voice signal obtained by the image processing circuit 207 and the voice processing circuit 214.

The image processing circuit 207 and the voice processing circuit 214 read out the image signal and the voice signal temporarily stored in the memory 215 and perform encoding of the image signal and encoding of the voice signal, thereby generating a compressed image signal and a compressed voice signal. The first control circuit 223 transmits the compressed image signal and the compressed voice signal to a recording/reproduction circuit 220.

The recording/reproduction circuit 220 records in a recording medium 221 the compressed image signal and the compressed voice signal generated by the image processing circuit 207 and the voice processing circuit 214, other control data concerning image capturing, and the like. If compression encoding is not performed for the voice signal, the first control circuit 223 transmits the voice signal generated by the voice processing circuit 214 and the compressed image signal generated by the image processing circuit 207 to the recording/reproduction circuit 220 and causes it to record the signals in the recording medium 221.

The recording medium 221 may be either a recording medium incorporated in the image capturing apparatus 101 or a detachable recording medium. The recording medium 221 can record various kinds of data such as the compressed image signal, the compressed voice signal, and the voice signal generated by the image capturing apparatus 101, and a medium having a capacity larger than that of the nonvolatile memory 216 is generally used. For example, the recording medium 221 includes recording media of all formats such as a hard disk, an optical disk, a magnetooptical disk, a CD-R, a DVD-R, a magnetic tape, a nonvolatile semiconductor memory, and a flash memory.

The recording/reproduction circuit 220 reads out (reproduces) the compressed image signal, the compressed voice signal, the voice signal, the various kind of data, and the programs recorded in the recording medium 221. The first control circuit 223 transmits the compressed image signal and the compressed voice signal which are read out to the image processing circuit 207 and the voice processing circuit 214. The image processing circuit 207 and the voice processing circuit 214 temporarily store the compressed image signal and the compressed voice signal in the memory 215, decode them in accordance with a predetermined procedure, and transmit the decoded signals to the video output circuit 217 and a voice output circuit 218.

The voice input circuit 213 has a plurality of microphones mounted on the image capturing apparatus 101, and the voice processing circuit 214 can detect the direction of a sound on a plane on which the plurality of microphones are installed, which is used for a search or automatic image capturing to be described later. In addition, the voice processing circuit 214 detects a specific voice command. As the voice command, several commands registered in advance may be used, or the user may be allowed to register a specific voice in the image capturing apparatus. Sound scene recognition is also performed. In the sound scene recognition, sound scene determination is performed by a network that has learned in advance by machine learning based on a large amount of voice data. For example, a network configured to detect a specific voice scene such as "shout for joy", "hand clap", or "voice utterance" is set in the voice processing circuit 214. Upon detecting a specific sound scene or a specific voice command, the voice processing circuit 214 outputs a detection trigger signal to the first control circuit 223 or the second control circuit 211.

The second control circuit 211 that is provided independently of the first control circuit 223 configured to control the entire main system of the image capturing apparatus 101 controls the supplied power of the first control circuit 223.

A first power supply circuit 210 and a second power supply circuit 212 supply power to operate the first control circuit 223 and the second control circuit 211 respectively. When a power button provided on the image capturing apparatus 101 is pressed, the power is first supplied to both the first control circuit 223 and the second control circuit 211. The first control circuit 223 controls the first power supply circuit 210 to turn off the power supply to itself, as will be described later. The second control circuit 211 operates even during the time when the first control circuit 223 is not operating, and information from the device shake detection circuit 209 or the voice processing circuit 214 is input. Based on various kinds of input information, the second control circuit performs determination processing of determining whether to activate the first control circuit 223. Upon determining to activate, the second control circuit instructs to supply power to the first control circuit.

The voice output circuit 218 outputs a preset voice pattern from a speaker incorporated in the image capturing apparatus 101 at the time of, for example, image capturing.

An LED control circuit 224 controls an LED provided on the image capturing apparatus 101 based on a preset lighting/blinking pattern at the time of, for example, image capturing.

The video output circuit 217 is formed from, for example, a video output element and transmits an image signal to a connected external display or the like to display a video. In addition, the voice output circuit 218 and the video output circuit 217 may be one connected terminal, for example, a terminal such as an HDMI® (High-Definition Multimedia Interface) terminal.

A communication circuit 222 performs communication between the image capturing apparatus 101 and an external apparatus and transmits or receives, for example, data such as a voice signal, an image signal, a compressed voice signal, or a compressed image signal. The communication circuit 222 also receives an image capturing start or end command or a control signal concerning image capturing such as pan/tilt or zoom driving and drives the image capturing apparatus 101 in accordance with an instruction of an external device capable of communicating with the image capturing apparatus 101. The communication circuit 222 also transmits or receives information such as various kinds of parameters concerning learning processed by a learning processing circuit 219 to be described later between the image capturing apparatus 101 and the external apparatus. The communication circuit 222 is, for example, a wireless communication module such as an infrared communication module, a Bluetooth® communication module, a wireless LAN communication module, a Wireless USB, or a GPS receiver.

<Arrangement to External Communication Device>

Figure 3:
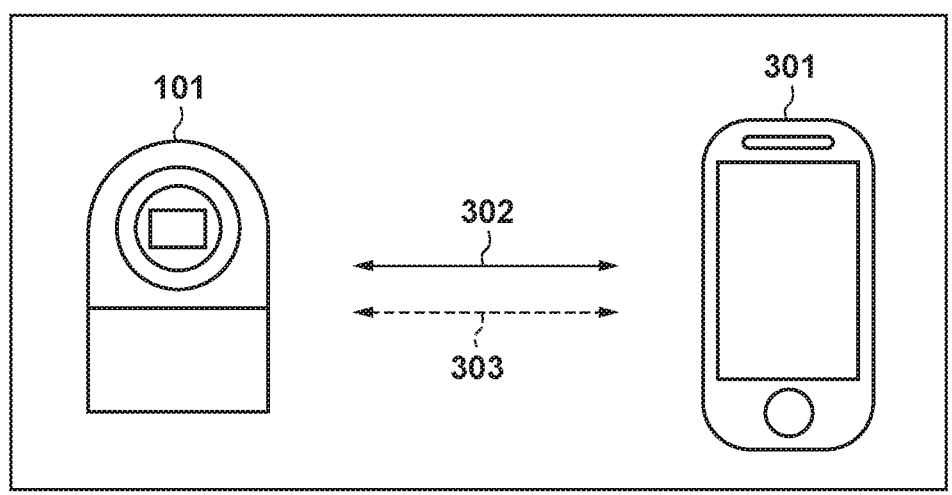
FIG. 3 is a view showing the arrangement of the image capturing apparatus and an external device.

FIG. 3 is a view showing an example of the arrangement of a wireless communication system between the image capturing apparatus 101 and an external apparatus 301. The image capturing apparatus 101 is a digital camera having an image capturing function, and the external apparatus 301 is a smart device including a Bluetooth communication module and a wireless LAN communication module.

The image capturing apparatus 101 and the smart device 301 can communicate by communication 302 by a wireless LAN complying with, for example, the IEEE 802.11 standard series and communication 303 with a master-slave relationship between a control station and a slave station, for example, Bluetooth Low Energy (to be referred to as "BLE" hereinafter). Note that the wireless LAN and BLE are examples of a communication method. Each communication apparatus has two or more communication functions. Another communication method may be used as long as one communication function of performing communication in the relationship between, for example, the control station and the slave station can control the other communication function. Without losing generality, the first communication such as a wireless LAN can perform communication at a speed higher than that of the second communication such as BLE, and the second communication has at least one of power consumption and communicable range less than that of the first communication.

Figure 4:
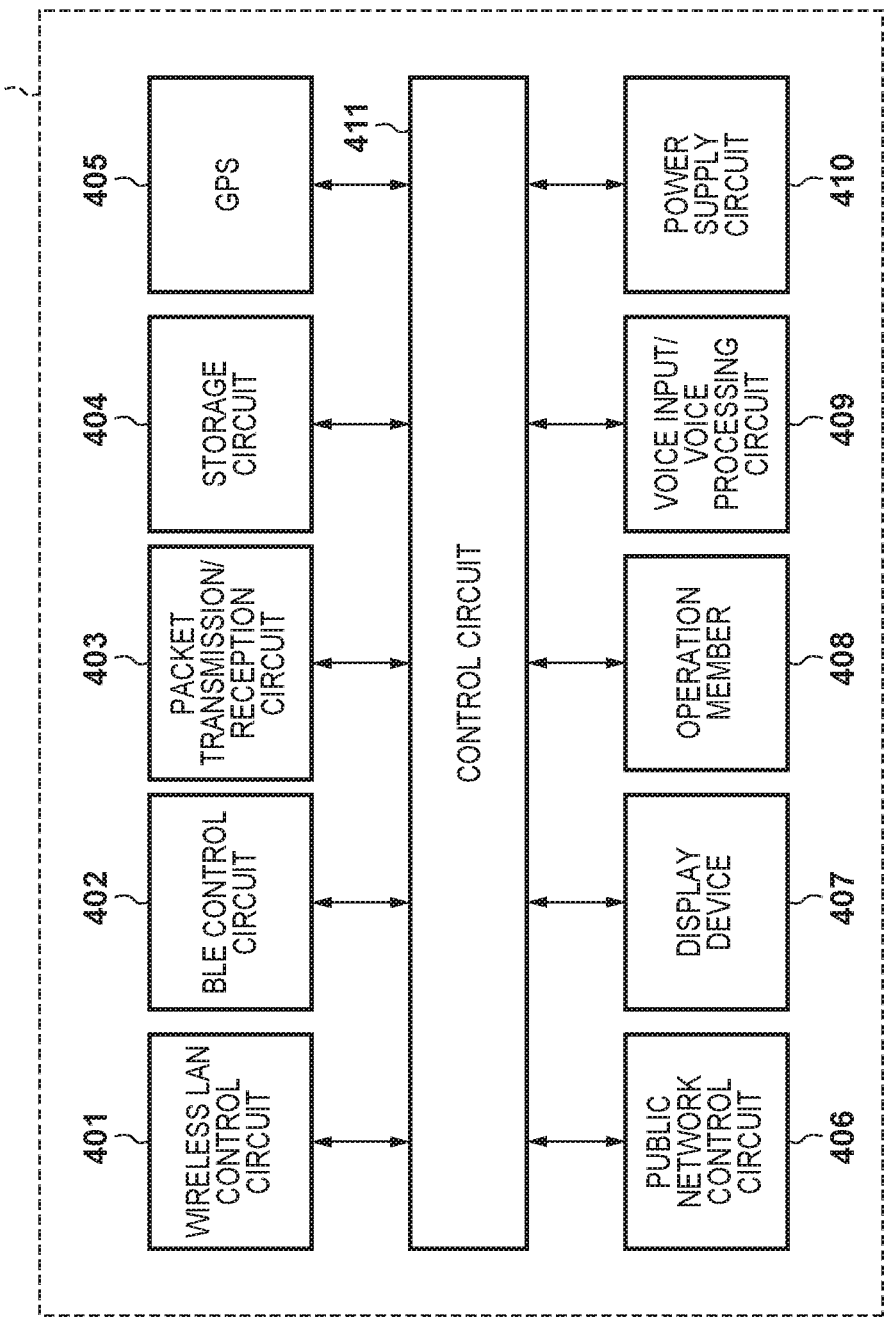
FIG. 4 is a block diagram showing the arrangement of the external device.

The arrangement of the smart device 301 will be described with reference to FIG. 4.

The smart device 301 includes, for example, a public network control circuit 406 for a public wireless communication in addition to a wireless LAN control circuit 401 for a wireless LAN and a BLE control circuit 402 for BLE. The smart device 301 also includes a packet transmission/reception circuit 403. The wireless LAN control circuit 401 performs RF control of the wireless LAN, communication processing, and protocol processing concerning a driver that performs various kinds of control of communication by the wireless LAN complying with the IEEE 802.11 standard series or communication by the wireless LAN. The BLE control circuit 402 performs RF control of the BLE, communication processing, and protocol processing concerning a driver that performs various kinds of control of communication by the BLE or communication by the BLE. The public network control circuit 406 performs RF control of the public wireless communication, communication processing, and protocol processing concerning a driver that performs various kinds of control of public wireless communication or public wireless communication. The public network control circuit 406 complies with, for example, the IMT (International Multimedia Telecommunications) standard or LTE (Long Term Evolution) standard. The packet transmission/reception circuit 403 performs processing for executing at least one of transmission and reception of packets concerning communication by the wireless LAN and BLE and public wireless communication. Note that in this example, the smart device 301 will be described as a device that performs at least one of transmission and reception of a packet in communication. However, another communication method, for example, line switching other than packet exchange may be used.

The smart device 301 further includes, for example, a control circuit 411, a storage circuit 404, a GPS (Global Positioning System) reception unit 405, a display device 407, an operation member 408, a voice input/voice processing circuit 409, and a power supply circuit 410. The control circuit 411 executes, for example, a control program stored in the storage circuit 404, thereby controlling the entire smart device 301. The storage circuit 404 stores, for example, the control program executed by the control circuit 411 and various kinds of information such as parameters necessary for communication. Various kinds of operations to be described later are implemented by executing the control program stored in the storage circuit 404 by the control circuit 411.

The power supply circuit 410 supplies power to the smart device 301. The display device 407 has a function of outputting visually recognizable information like, for example, an LCD or an LED or a function of outputting a sound like a speaker and displays various kinds of information. The operation member 408 includes, for example, a button configured to receive an operation on the smart device 301 by the user. Note that the display device 407 and the operation member 408 may be formed by, for example, a common member such as a touch panel.

The voice input/voice processing circuit 409 may be configured to, for example, acquire a voice uttered by the user from a general-purpose microphone incorporated in the smart device 301 and acquire a user operation instruction by voice recognition processing.

In addition, the voice input/voice processing circuit 409 acquires a voice command by the utterance of the user via a dedicated application in the smart device. The voice command can also be registered as a specific voice command to be recognized by the voice processing circuit 214 of the image capturing apparatus 101 via the communication 302 by the wireless LAN.

The GPS 405 receives a GPS signal notified from a satellite, analyzes the GPS signal, and estimates the current position (latitude/longitude information) of the smart device 301. Alternatively, as the position estimation, the current position of the smart device 301 may be estimated based on the information of a wireless network existing on the periphery using a WPS (Wi-Fi Positioning System) or the like. If the acquired current GPS position information is located within a preset position range (within the range of a predetermined radius), movement information is notified to the image capturing apparatus 101 via the BLE control circuit 402 and used as a parameter for automatic image capturing to be described later or automatic editing. In addition, if a position change of a predetermined level or more occurs in the GPS position information, movement information is notified to the image capturing apparatus 101 via the BLE control circuit 402 and used as a parameter for automatic image capturing to be described later or automatic editing.

As described above, the image capturing apparatus 101 and the smart device 301 exchange data by communication using the wireless LAN control circuit 401 and the BLE control circuit 402. For example, data such as a voice signal, an image signal, a compressed voice signal, or a compressed image signal is exchanged. In addition, the smart device transmits an operation instruction for image capturing of the image capturing apparatus 101 or the like or voice command registration data or transmits a predetermined position detection notification or position movement notification based on GPS position information. In addition, learning data is transmitted/received via a dedicated application in the smart device.

<Arrangement of Accessories>

Figure 5:
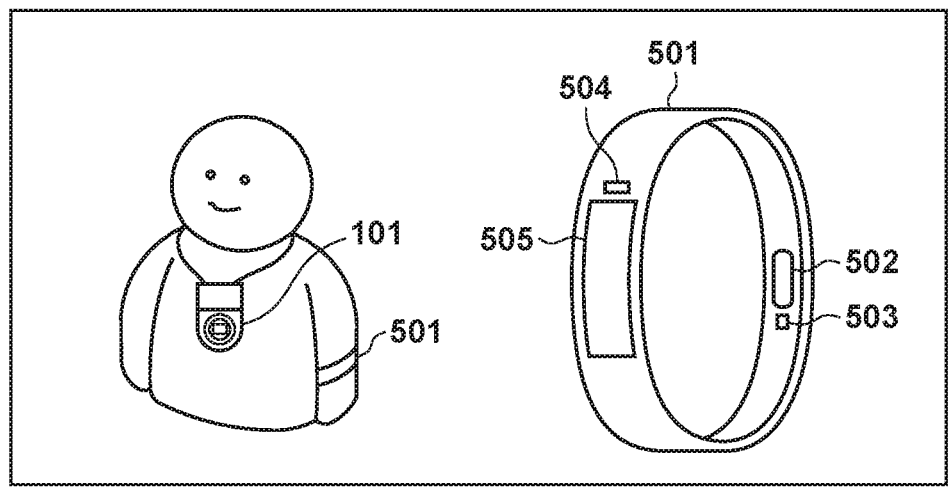
FIG. 5 is a view showing the arrangement of the image capturing apparatus and an external device.

FIG. 5 is a view showing an example of the arrangement to an external apparatus 501 capable of communicating with the image capturing apparatus 101. The image capturing apparatus 101 is a digital camera having an image capturing function, and the external apparatus 501 is a wearable device including various kinds of sensing units capable of communicating with the image capturing apparatus 101 by, for example, a Bluetooth communication module.

The wearable device 501 is configured to be attachable to, for example, a user's arm and includes sensors configured to detect biological information such as the pulses, heartbeat, and blood flow of the user at a predetermined period, an acceleration sensor capable of detecting the motion state of the user, and the like.

A biological information detection circuit 502 includes, for example, a pulse sensor configured to detect pulses, a heartbeat sensor configured to detect a heartbeat, a blood flow sensor configured to detect a blood flow, and a sensor configured to detect that a change in a potential is detected by skin contact by a conductive polymer. In this embodiment, a description will be made using a heartbeat sensor as the biological information detection circuit 502. The heartbeat sensor, for example, irradiates a skin with infrared light using an LED or the like, detects the infrared light transmitted through the skin by a light-receiving sensor, and performs signal processing, thereby detecting the heartbeat of the user. The biological information detection circuit 502 outputs the detected biological information as a signal to a control circuit 607 to be described later.

A shake detection circuit 503 configured to detect the motion state of the user includes, for example, an acceleration sensor or a gyro sensor and can detect, based on the information of acceleration, a motion representing whether the user is moving or making an action by swinging the arm.

The wearable device 501 also includes an operation member 505 that receives an operation on the wearable device 501 by the user, and a display device 504 such as an LCD or an LED that outputs visually recognizable information.

Figure 6:
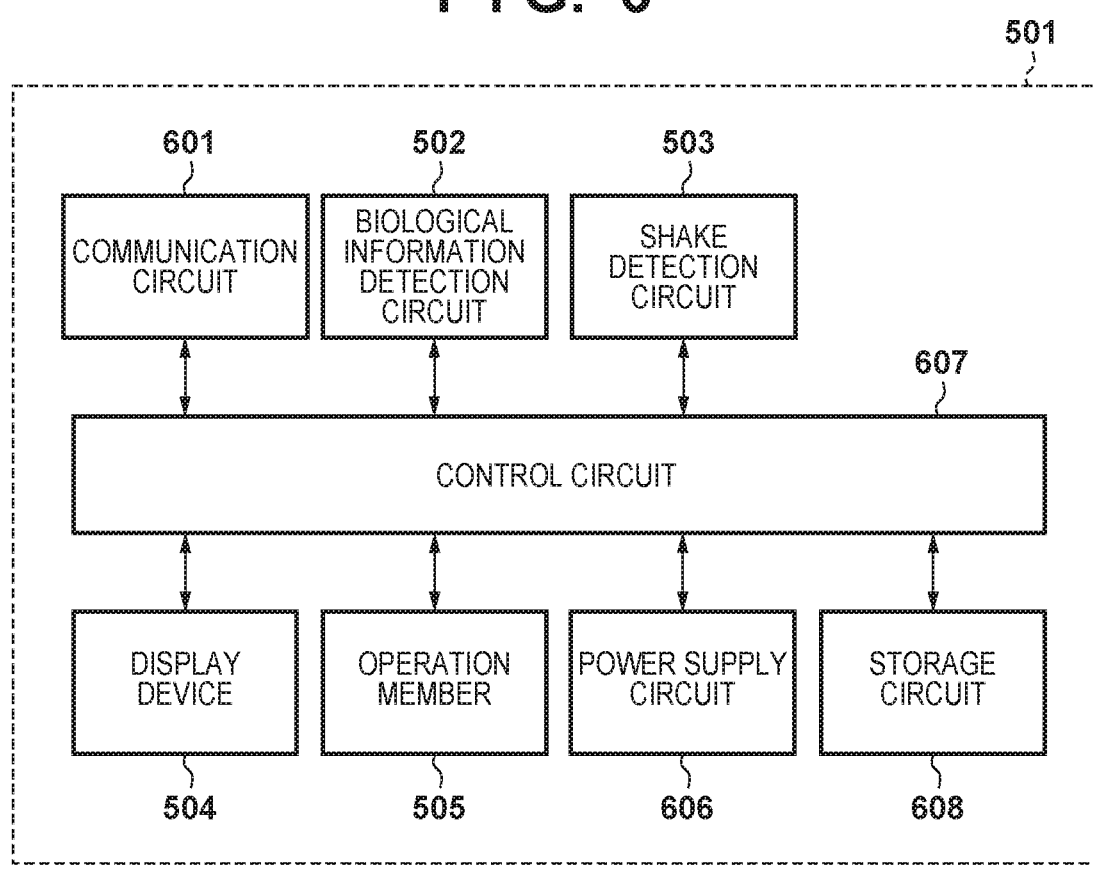
FIG. 6 is a block diagram showing the arrangement of the external device.

The arrangement of the wearable device 501 will be described with reference to FIG. 6.

The wearable device 501 includes, for example, the control circuit 607, a communication circuit 601, the biological information detection circuit 502, the shake detection circuit 503, the display device 504, the operation member 505, a power supply circuit 606, and a storage circuit 608.

The control circuit 607 executes, for example, a control program stored in the storage circuit 608, thereby controlling the entire wearable device 501. The storage circuit 608 stores, for example, the control program executed by the control circuit 607 and various kinds of information such as parameters necessary for communication. Various kinds of operations to be described later are implemented by, for example, executing the control program stored in the storage circuit 608 by the control circuit 607.

The power supply circuit 606 supplies power to the wearable device 501. The display device 504 has a function of outputting visually recognizable information like, for example, an LCD or an LED or a function of outputting a sound like a speaker and displays various kinds of information. The operation member 505 includes, for example, a button configured to receive an operation on the wearable device 501 by the user. Note that the display device 504 and the operation member 505 may be formed by, for example, a common member such as a touch panel.

In addition, the operation member may be configured to, for example, acquire a voice uttered by the user from a general-purpose microphone incorporated in the wearable device 501 and acquire a user operation instruction by voice recognition processing.

Various kinds of detection information processed by the control circuit 607 from the biological information detection circuit 502 or the shake detection circuit 503 are transmitted to the image capturing apparatus 101 by the communication circuit 601.

For example, the communication circuit 601 transmits the detection information to the image capturing apparatus 101 at a timing of detecting a change in the heartbeat of the user or transmits the detection information at the timing of a change in the moving state such as a walking movement/running movement/stop. In addition, for example, the communication circuit 601 transmits the detection information at a timing of detecting a preset arm swinging motion or transmits the detection information at a timing of detecting a movement by a preset distance.

<Sequence of Image Capturing Operation>

Figure 7:
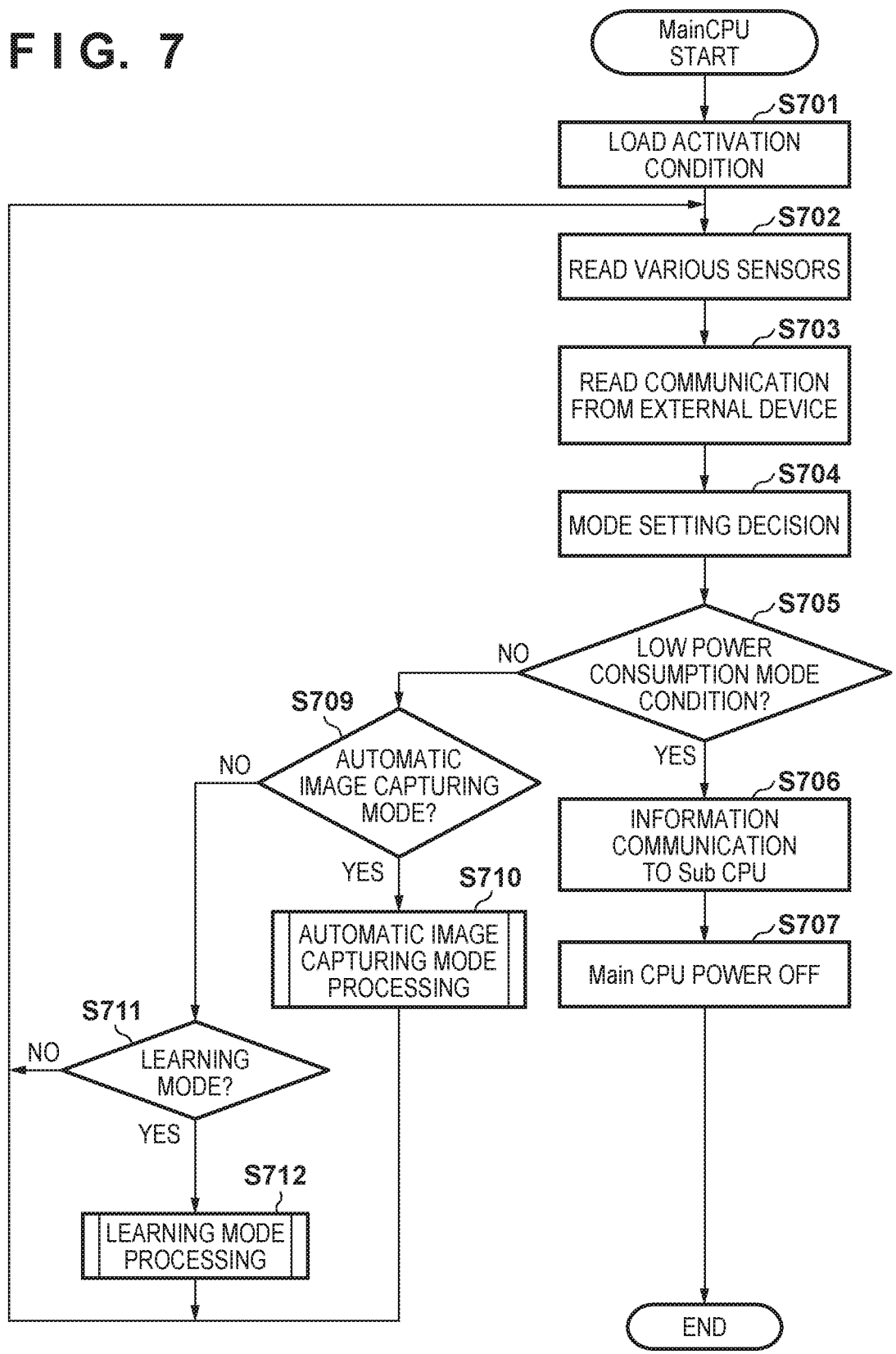
FIG. 7 is a flowchart for explaining a first control circuit.

FIG. 7 is a flowchart for explaining an example of the operation performed by the first control circuit 223 of the image capturing apparatus 101 according to this embodiment.

When the user operates the power button provided on the image capturing apparatus 101, the first power supply circuit 210 causes a power supply unit to supply power to the first control circuit 223 and each block of the image capturing apparatus 101.

In the second control circuit 211 as well, the second power supply circuit 212 causes a power supply unit to supply second power supply circuit to the second control circuit 211. Details of the operation of the second control circuit will be explained with reference to the flowchart of FIG. 8 to be described later.

When the power is supplied, processing shown in FIG. 7 starts. In step S701 ("step" will simply be abbreviated as "S" hereinafter), an activation condition is loaded.

In this embodiment, activation conditions are as follows.

(1) Power supply is started by manually pressing the power button.

(2) Power supply is started according to an instruction by external communication (for example, BLE communication) from an external device (for example, the smart device 301).

(3) Power supply is started from a Sub processor (second control circuit 211).

Here, in the case of (3) power supply is started from a Sub processor, an activation condition calculated in the Sub processor is loaded. Details will be explained with reference to FIG. 8 to be described later.

In addition, the activation condition loaded here is used as one parameter element in an object search or automatic image capturing, as will be described later. When the activation condition loading ends, the process advances to S702.

In S702, various kinds of sensors are read. The sensors read here are sensors configured to detect a vibration such as the gyro sensor and the acceleration sensor from the device shake detection circuit 209. In addition, the rotation position of the tilt rotation unit 104 or the pan rotation unit 105 is read. Furthermore, a voice level detected by the voice processing circuit 214, the detection trigger of specific voice recognition, or a sound direction is detected.

Although not illustrated in FIGS. 1A to 6, sensors configured to detect environmental information also acquire information.

For example, there exist a temperature sensor configured to detect a temperature around the image capturing apparatus 101 at a predetermined period and an atmospheric pressure sensor configured to detect a change in the atmospheric pressure around the image capturing apparatus 101. In addition, an illuminance sensor configured to detect the brightness around the image capturing apparatus 101, a humidity sensor configured to detect the humidity around the image capturing apparatus 101, a UV sensor configured to detect a UV light amount the image capturing apparatus 101, and the like may be provided. In addition to the detected temperature information, atmospheric pressure information, brightness information, humidity information, and UV information, a temperature change amount, atmospheric pressure change amount, brightness change amount, humidity change amount, UV change amount, and the like obtained by calculating a change rate at a predetermined time interval from the various kinds of detection information are used for determination in automatic image capturing or the like to be described later.

When the various kinds of sensors are read in S702, the process advances to S703.

In S703, it is detected whether communication from an external device is instructed. If a communication instruction is received, communication with the external device is performed.

For example, a remote operation or data such as a voice signal, an image signal, a compressed voice signal, or a compressed image signal is transmitted or received to or from the smart device 301 via a wireless LAN or BLE. In addition, loading is performed to determine whether the smart device 301 has transmitted an operation instruction for image capturing of the image capturing apparatus 101 or the like, voice command registration data, a predetermined position detection notification or position movement notification based on GPS position information, or a learning data transmission/reception instruction.

In addition, for example, if the motion information of the user, the action information of the arm, or biological information such as a heartbeat is updated from the wearable device 501, loading of information via BLE is performed. Furthermore, the various kinds of sensors configured to detect the above-described environmental information may be mounted on the image capturing apparatus 101. However, they may be mounted in the smart device 301 or the wearable device 501. In this case, loading of environmental information via BLE is also performed. When communication loading from the external device is done in S703, the process advances to S704.

In S704, mode setting determination is performed. The mode set in S704 is determined and selected from the following modes.

(1) Automatic Image Capturing Mode

[Mode Determination Condition]

If it is determined, based on the pieces of detection information (image, sound, time, vibration, place, change in body, and change in environment) set by learning to be described later, the time elapsed from the transition to the automatic image capturing mode, past image capturing information, and the like, that automatic image capturing should be performed, the mode is set to the automatic image capturing mode.

[Intra-Mode Processing]

In automatic image capturing mode processing (S710), an object is automatically searched for by pan/tilt or zoom driving based on the pieces of detection information (image, sound, time, vibration, place, change in body, and change in environment).

Upon determining that it is a timing capable of performing image capturing according to the user's preference, image capturing is automatically performed.

(2) Learning Mode

[Mode Determination Condition]

If it is determined, based on the time elapsed from the previous learning processing, the number of information or learning data associated with images usable for learning, and the like, that automatic learning should be performed, the mode is set to the automatic learning mode. This mode is set even when an instruction to set learning data is received via communication from the smart device 301.

[Intra-Mode Processing]

In automatic learning mode processing (S712), learning according to the user's preference is performed. The learning according to the user's preference is performed using a neural network based on the information of operations on the smart device 301, a learning information notification from the smart device 301, and the like. As the information of operations on the smart device 301, there are, for example, image acquisition information from the image capturing apparatus, information for which a manual editing instruction is done via a dedicated application, and determination value information input by the user to an image in the image capturing apparatus.

Note that details of the automatic image capturing mode processing and the learning mode processing will be described later.

In S705, it is determined whether the mode setting determination in S704 is set to a low power consumption mode. In the low power consumption mode determination, if the determination condition is neither a determination condition of "automatic image capturing mode" nor a determination condition of "learning mode" to be described later, it is determined that a low power consumption mode is set. When the determination processing is performed, the process advances to S705.

Upon determining in S705 that the condition is the low power consumption mode condition, the process advances to S706.

In S706, the Sub processor (second control circuit 211) is notified of various kinds of parameters (a shake detection determination parameter, a sound detection parameter, and a time elapse detection parameter) concerning an activation factor to be determined in the Sub processor. The values of the various kinds of parameters change when learned in learning processing to be described later. When the process of S706 ends, the process advances to S707 to power off the Main processor (first control circuit 223), and the processing ends.

On the other hand, upon determining in S705 that the mode is not the low power consumption mode, the process advances to S709 to determine whether the mode setting is the automatic image capturing mode. If the mode is the automatic image capturing mode, the process advances to S710 to perform automatic image capturing mode processing. When the processing ends, the process returns to S702 to repeat the processing. If it is determined in S709 that the mode is not the automatic image capturing mode, the process advances to S711.

In S711, it is determined whether the mode setting is the learning mode. If the mode is the learning mode, the process advances to S712 to perform learning mode processing. When the processing ends, the process returns to S702 to repeat the processing. If it is determined in S711 that the mode is not the learning mode, the process returns to S702 to repeat the processing.

Figure 8:
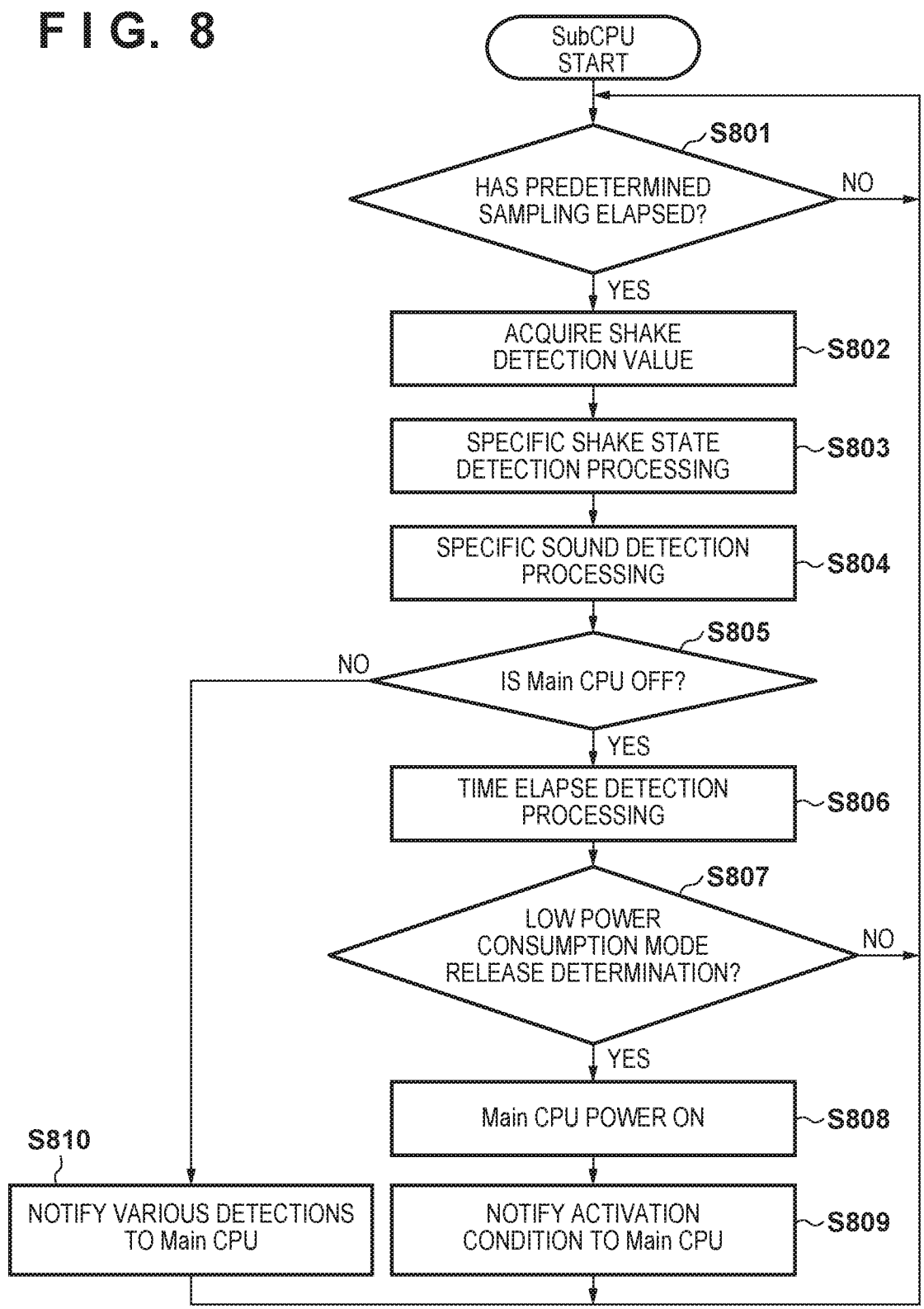
FIG. 8 is a flowchart for explaining a second control circuit.

FIG. 8 is a flowchart for explaining an example of the operation performed by the second control circuit 211 of the image capturing apparatus 101 according to this embodiment.

When the user operates the power button provided on the image capturing apparatus 101, the first power supply circuit 210 causes the power supply unit to supply power to the first control circuit 223. In the second control circuit 211 as well, the second power supply circuit 212 causes the power supply unit to supply second power supply circuit to the second control circuit 211. When the power is supplied, the Sub processor (second control circuit 211) is activated, and processing shown in FIG. 8 starts.

In S801, it is determined whether a predetermined period serving as the period of sampling has elapsed. For example, if the period is set to 10 msec, the process advances to S802 at a period of 10 msec. Upon determining that the predetermined period has not elapsed, the Sub processor returns to S801 without performing any processing and waits for the elapse of the predetermined period.

In S802, a shake detection value is acquired. The shake detection value is a value output from a sensor configured to detect a vibration, such as the gyro sensor or the acceleration sensor from the device shake detection circuit 209.

When the shake detection value is acquired in S802, the process advances to S803 to perform preset shake state detection processing. Several examples will be described.

(1) Tap Detection

A state (tap state) in which the user taps the image capturing apparatus 101 by, for example, a fingertip or the like can be detected based on the output value of the acceleration sensor attached to the image capturing apparatus 101. When the output of the three-axis acceleration sensor is passed through a bandpass filter (BPF) set to a specific frequency domain at a predetermined sampling period, the signal region of an acceleration change caused by the tap can be extracted. Tap detection is done based on whether the number of times the acceleration signal after the BPF has exceeded a predetermined threshold ThreshA within a predetermined time TimeA is a predetermined count CountA. In a case of double tap, CountA is set to 2. In a case of triple tap, CountA is set to 3.

(2) Detection of Shake State

A shake state of the image capturing apparatus 101 can be detected based on the output value to the gyro sensor or the acceleration sensor attached to the image capturing apparatus 101. After the high frequency component of the output of the gyro sensor or the acceleration sensor is cut by an HPF, and the low frequency component is cut by an LPF, absolute value conversion is performed. Vibration detection is done based on whether the number of times the calculated absolute value has exceeded a predetermined threshold ThreshB within a predetermined time TimeB is a predetermined count CountB or more. For example, it can be determined whether it is a state in which a small shake is caused by, for example, placing the image capturing apparatus 101 on a desk or the like or a state in which a large shake is caused because, for example, the user wears the image capturing apparatus 101 and walks. When a plurality of determination thresholds or conditions of the count to be determined are provided, the shake state can finely be detected in accordance with a shake level.

When specific shake state detection processing is performed in S803, the process advances to S804 to perform preset specific sound detection processing. Several examples will be described.

(1) Specific Voice Command Detection

A specific voice command is detected. As the voice command, the user can register a specific voice in the image capturing apparatus in addition to several commands registered in advance.

(2) Specific Sound Scene Recognition

Sound scene determination is performed by a network that has learned in advance by machine learning based on a large amount of voice data. For example, a specific scene such as "shout for joy", "hand clap", or "voice utterance" is detected.

(3) Sound Level Determination

Detection by sound level determination is performed by a method of, for example, adding times in which the magnitude of sound level exceeds a predetermined level threshold during a predetermined time.

(4) Sound Direction Determination

The direction of a sound on a plane on which a plurality of microphones are installed can be detected. The direction of a sound is detected for a sound level of a predetermined magnitude.

The above-described determination processing is performed in the voice processing circuit 214. In S804, it is determined whether specific sound detection is performed based on each setting learned in advance.

When specific sound detection processing is performed in S804, the process advances to S805. In S805, the Main processor (first control circuit 223) determines whether it is in the OFF state. If the Main processor is in the OFF state, the process advances to S806 to perform preset time elapse detection processing. The time elapsed from the transition of the Main processor from ON to OFF is measured. If the elapsed time is equal to or more than a parameter TimeC, it is determined that the time has elapsed. If the elapsed time is less than TimeC, it is not determined that the time has elapsed.

When the time elapse detection processing is performed in S806, the process advances to S807 to determine whether low power consumption mode cancel determination is done. The low power consumption mode cancel condition is determined by the following conditions.

(1) Determination condition of specific shake detection (2) Determination condition of specific sound detection (3) Determination condition of time elapse determination It can be determined, by the specific shake state detection processing in S803, whether the determination condition of specific shake detection is met. In addition, it can be determined, by the specific sound detection processing in S804, whether the determination condition of specific sound detection is met. Furthermore, it can be determined, by the time elapse detection processing in S806, whether the determination condition of time elapse detection is met. Hence, if at least one condition is met, determination is done to cancel the low power consumption mode.

When the cancel condition is determined in S807, the process advances to S808 to power on the Main processor. In S809, the Main processor is notified of the condition (shake, sound, or time) to determine low power consumption mode cancel. The process returns to S801 to loop the processing.

If any cancel condition is not met in S807, and it is determined not to cancel the low power consumption mode, the process returns to S801 to loop the processing.

Upon determining in S805 that the Main processor is in the ON state, the Main processor is notified of the pieces of information acquired in S802 to S805. Then, the process returns to S801 to loop the processing.

In this embodiment, even when the Main processor is in the ON state, the Sub processor performs shake detection or specific sound detection and notifies the Main processor of the detection result. However, when the Main processor is in the ON state, shake detection or specific sound detection may be done by the processing (S702 in FIG. 7) in the Main processor without performing the processes of S802 to S805.

The low power consumption mode cancel method based on shake detection, sound detection, or time elapse has been described above in detail. However, the low power consumption mode may be canceled based on environmental information. As for the environmental information, the determination can be performed based on whether the absolute amount or change amount of the temperature, atmospheric pressure, brightness, humidity, or UV light amount exceeds a predetermined threshold.

<Automatic Image Capturing Mode>

Figure 9:
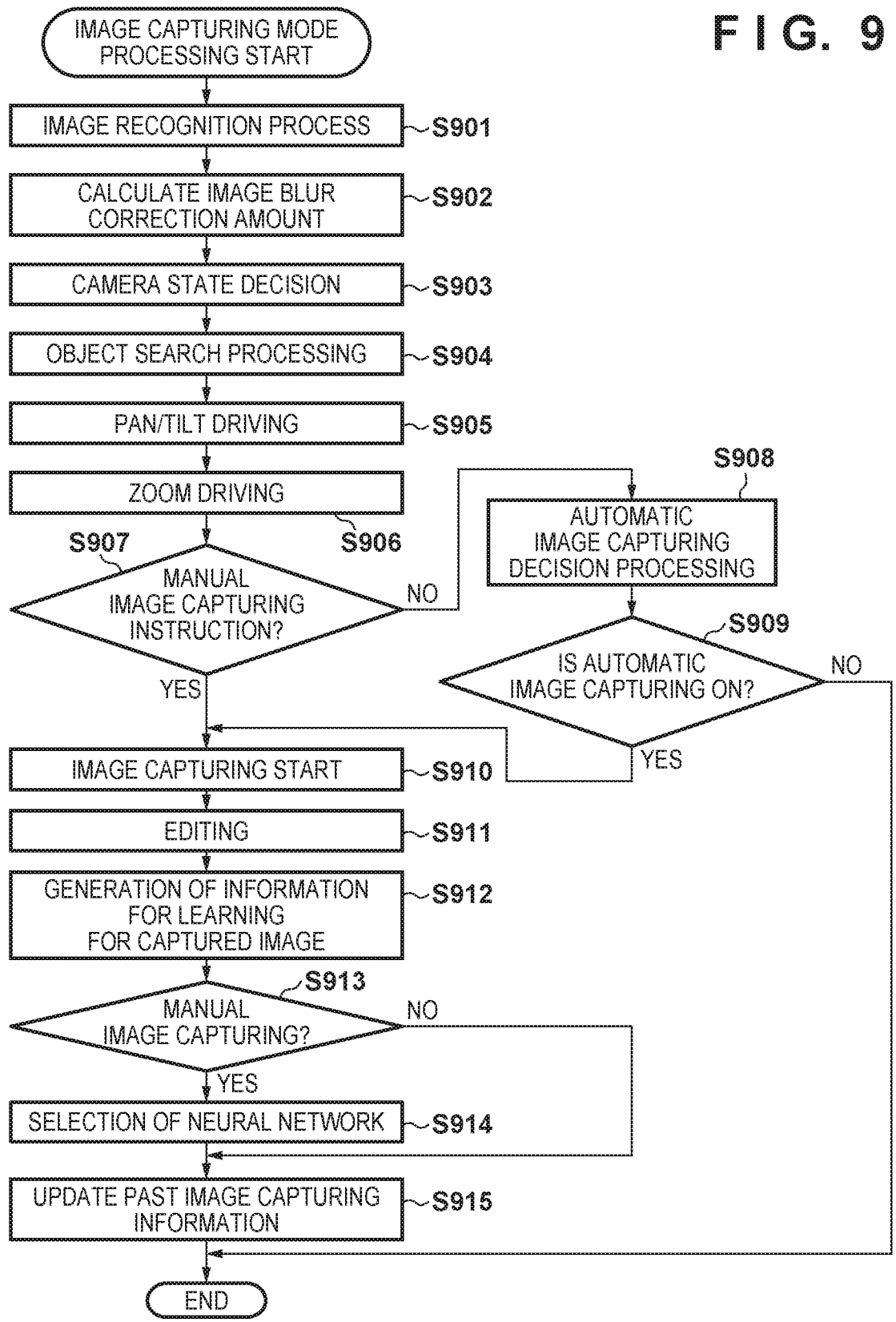
FIG. 9 is a flowchart for explaining image capturing mode processing.

Details of the automatic image capturing mode will be described with reference to FIG. 9. As described above, the following processing is controlled by the first control circuit 223 of the image capturing apparatus 101 according to this embodiment.

In S901, the image processing circuit 207 is caused to perform image processing of a signal taken by the image capturing unit 206 and generate an image for object recognition.

Object recognition such as person or object recognition is performed from the generate image.

When recognizing a person, the face or body of the object is detected. In face detection processing, a pattern used to judge the face of a person is decided in advance, and a portion of the captured image, which matches the pattern, can be detected as the face image of a person.

In addition, a reliability representing the likelihood as the face of the object is simultaneously calculated. The reliability is calculated from, for example, the size of the face region in the image, the degree of matching with the face pattern, or the like.

In object recognition as well, an object that matches a pattern registered in advance can be recognized.

There is also a method of extracting a characteristic object by a method using the histogram of the hue or saturation in the captured image. In this case, concerning the image of the object captured in the image capturing angle, processing of dividing a distribution derived from the histogram of the hue or saturation into a plurality of sections and classifying the captured image in each section is executed.

For example, the histograms of a plurality of color components are created for the captured image and divided into mountain-shaped distribution ranges. The captured image is classified in a region belonging to the combination of the same section, thereby recognizing the image region of the object.

An evaluation value is calculated for each recognized image region of the object, thereby determining the image region of the object of the highest evaluation value as a main object region.

Each object information can be obtained from image capturing information by the above-described method.

In S902, an image blur correction amount is calculated. More specifically, first, the absolute angle of the image capturing apparatus is calculated based on an angular velocity and acceleration information acquired by the device shake detection circuit 209. A vibration damping angle to move the tilt rotation unit 104 and the pan rotation unit 105 in an angle direction to cancel the absolute angle is obtained as an image blur correction amount. Note that the calculation method of the image blur correction amount calculation processing here can be changed by learning processing to be described later.

In S903, state determination of the image capturing apparatus is performed. The current vibration/motion state of the image capturing apparatus is determined based on an angle, a moving amount, and the like detected by angular velocity information, acceleration information, GPS position information, and the like.

For example, when the image capturing apparatus 101 is attached to a car to perform image capturing, object information such as the ambient scenery largely changes depending on the distance to move.

For this reason, it can be determined whether the state is "vehicle moving state" in which the image capturing apparatus is attached to a car or the like and moves at a high speed, and the information can be used for an automatic object search to be described later.

In addition, it is determined whether the change in the angle is large, and it is determined whether the state is "stationary image capturing state" in which the shake angle of the image capturing apparatus 101 is almost zero.

In the "stationary image capturing state", since the angle change of the image capturing apparatus 101 itself can be considered to be zero, an object search for stationary image capturing can be performed.

In addition, if the angle change is relatively large, it is determined that the state is "hand-held state", and an object search for hand-held image capturing can be performed.

In S904, object search processing is performed. The object search is constituted by the following processes.

(1) Area Division

Figure 11A:
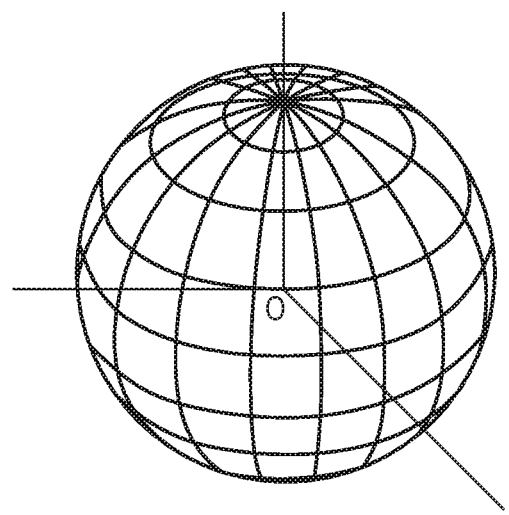
FIGS. 11A to 11D are views for explaining area division in a captured image.
Figure 11B:
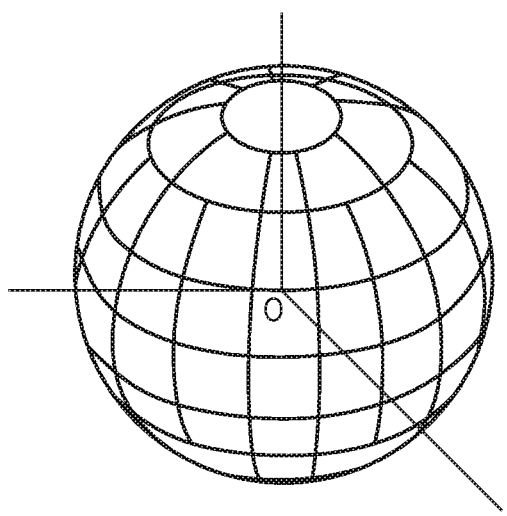
Figure 11C:
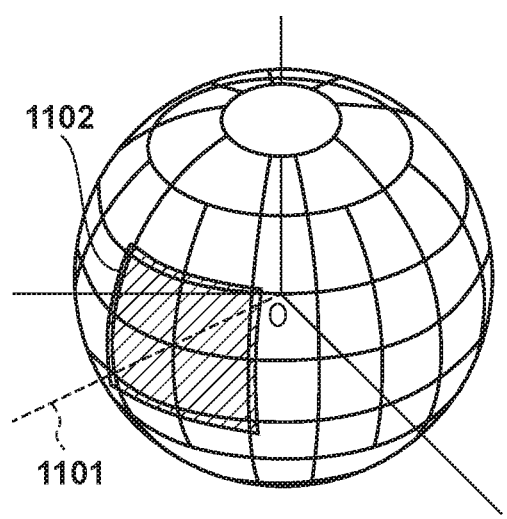
Figure 11D:
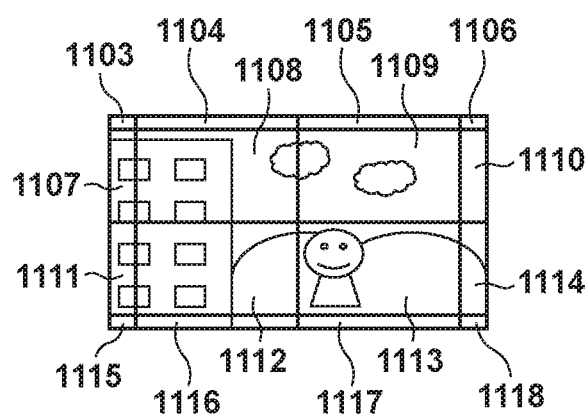

Area division will be described with reference to FIGS. 11A to 11D. As shown in FIG. 11A, the center is set at the position of the image capturing apparatus (an origin O is the image capturing apparatus position), and area division is performed throughout the circumference. In an example shown in FIG. 11A, the whole circumference is divided at 22.5° in the tilt direction and pan direction. When the area is divided as shown in FIG. 11A, as the angle in the tilt direction separates from 0°, the circumference of a circle in the horizontal direction becomes small, and the area region becomes small. Hence, as shown in FIG. 11B, when the tilt angle is 45° or more, the area range in the horizontal direction is set to be larger than 22.5°. FIGS. 11C and 11D show an example in which area division is done in the image capturing angle. An axis 1101 represents the direction of the image capturing apparatus 101 at the time of initialization. Area division is performed while setting this direction angle as a reference position. Reference numeral 1102 denotes a field angle area of the captured image. FIG. 11D shows an example of the image at this time. In the image captured in the field angle, image division is done as indicated by 1103 to 1118 in FIG. 11D based on the area division.

(2) Calculation of Importance Level in Each Area

For each area divided as described above, an importance level representing a priority order to perform a search is calculated in accordance with the object existing in the area or the scene state of the area. The importance level according to the state of the object is calculated based on, for example, the number of persons existing in the area, the size of the face of each person, face orientations, the likelihood of face detection, the expressions of the persons, and the personal authentication results of the persons. In addition, the importance level according to the state of the scene is calculated based on, for example, a generic object recognition result, a scene discrimination result (blue sky, backlight, evening scene, or the like), the level of a sound from the direction of the area and a voice recognition result, motion detection information in the area, and the like. Furthermore, the vibration state of the image capturing apparatus is detected in the state determination of the image capturing apparatus (S903), and the importance level may change in accordance with the vibration state as well. For example, in a case in which it is determined that the state is "stationary image capturing state", it is determined to raise the importance level upon detecting face authentication of a specific person such that the object search is performed mainly for an object of high priority (for example, the user of the image capturing apparatus) in objects registered for face authentication. In addition, automatic image capturing to be described later is also performed preferentially for the face. Even if the time in which the user of the image capturing apparatus carries the image capturing apparatus worn by him/her and performs image capturing is long, many images in which the user is captured can be left by detaching the image capturing apparatus and placing it on a desk or the like. At this time, the search can be performed by pan/tilt. Hence, images in which the user is captured or group photos in which many faces are captured can be left by only simply setting up the image capturing apparatus without considering the angle to place it. Note that under only the above-described conditions, the area of the highest importance level does not change unless a change occurs in each area, and as a result, the area to be searched never changes. To prevent this, the importance level is changed in accordance with past image capturing information. More specifically, the importance level of an area designated as the search area continuously for a predetermined time may be lowered. Alternatively, for an area where image capturing is performed in S910 to be described later, the importance level may be lowered for a predetermined time.

(3) Decision of Search Target Area

When the importance level of each area is calculated as described above, an area of high importance level is decided as a search target area. Then, a pan/tilt search target angle necessary to capture the search target area in the field angle is calculated.

In S905, pan/tilt driving is performed. More specifically, the image blur correction amount and a driving angle in control sampling based on the pan/tilt search target angle are added, thereby calculating the pan/tilt driving amount. The tilt rotation unit 104 and the pan rotation unit 105 are driven and controlled by the lens barrel rotation driving circuit 205.

In S906, zoom driving is performed by controlling the zoom unit 201. More specifically, zoom is driven in accordance with the state of the search target object decided in S904. For example, when the search target object is the face of a person, and the face on the image is too small, detection may be impossible, and the face may be lost. In this case, zoom is performed to the tele-photo side, thereby performing control such that the size of the face on the image becomes large. On the other hand, in a case in which the face on the image is too large, the object is readily off the field angle in accordance with the motion of the object or the image capturing apparatus itself. In this case, zoom is performed to the wide angle side, thereby performing control such that the size of the face on the image becomes small. When zoom control is performed in this way, a state suitable to track the object can be maintained.

In S904 to S906, a method of performing the object search by pan/tilt or zoom driving has been described. However, the object search may be performed by an image capturing system configured to capture all directions at once using a plurality of wide-angle lenses. In the case of an omnidirectional camera, if all signals obtained by image capturing are used as input images, and image processing such as object detection is performed, enormous processing is necessary. To avoid this, a part of an image is cut out, and object search processing is performed in the cutout image range. As in the above-described method, the importance level of each area is calculated, the cutout position is changed based on the importance level, and determination of automatic image capturing to be described later is performed. This enables reduction of power consumption by image processing and a high-speed object search.

In S907, it is determined whether an image capturing instruction by the user (manual) is received. Upon receiving the image capturing instruction, the process advances to S910. At this time, the image capturing instruction by the user (manual) may be input by pressing the shutter button, lightly tapping the housing of the image capturing apparatus with a finger or the like, inputting a voice command, or inputting an instruction from an external device. The image capturing instruction by the tap operation is an image capturing instruction method in which when the user taps the housing of the image capturing apparatus, the device shake detection circuit 209 detects a continuous high-frequency acceleration in a short period as a trigger to image capturing. The voice command input is an image capturing instruction method in which when the user utters a keyword (for example, "take a picture") to instruct predetermined image capturing, the voice processing circuit 214 recognizes the voice as a trigger to image capturing. The instruction from an external device is an image capturing instruction method in which, for example, a shutter instruction signal transmitted, via a dedicated application, from a smartphone or the like connected to the image capturing apparatus by Bluetooth is used as a trigger.

If the image capturing instruction is not received in S907, the process advances to S908 to determine whether to perform automatic image capturing.

(1) Determination about Whether to Perform Automatic Image Capturing

Figure 10:
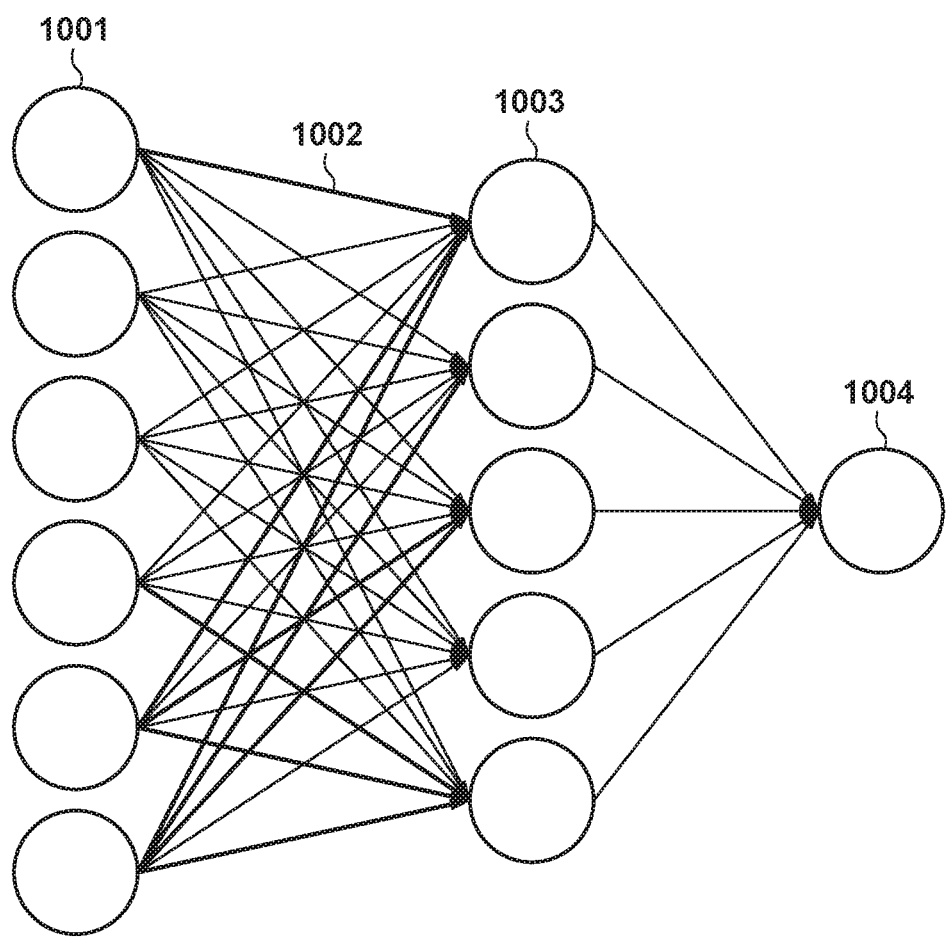
FIG. 10 is a view for explaining a neural network.

The determination about whether to perform automatic image capturing is a determination based on a neural network as one type of machine learning system. As an example of the neural network, an example of a network by a multilayer perceptron is shown in FIG. 10. The neural network is used to predict an output value from an input value. When an input value and an output value as a model to the input are learned in advance, an output value according to the learned model can be estimated in correspondence with a new input value. Note that the method of learning will be described later. Reference numeral 1001 in FIG. 10 and vertically arranged circles represent neurons of an input layer, reference numeral 1003 and vertically arranged circles represent neurons of an intermediate layer, and reference numeral 1004 denotes a neuron of an output layer. An arrow 1002 represents a bond that connects neurons. In the determination based on the neural network, objects in the current field angle or feature amounts based on the states of the scene and the image capturing apparatus are given as inputs to the neurons of the input layer, and a value output from the output layer after operations based on the forward propagation rule of the multilayer perceptron is obtained. If the output value is equal to or more than a threshold, a determination to execute automatic image capturing is made. Note that as the features of the object, a current zoom magnification, a generic object recognition result in the current field angle, a face detection result, the number of faces captured in the current field angle, the degree of smile/degree of eye closing in faces, a face angle, the angle of line of sight of an object person, a scene discrimination result, a detection result of a specific composition, and the like are used. In addition, the time elapsed from the preceding image capturing, the current time, GPS position information and a change amount from the preceding image capturing position, the current voice level, a person who utters a voice, clap, whether there is a shout for joy or not, and the like may be used. In addition, vibration information (acceleration information and the state of the image capturing apparatus), environmental information (temperature, atmospheric pressure, illuminance, humidity, and UV light amount), and the like may be used. If an information notification from the wearable device 501 is received, the notified information (the motion information of the user, the action information of an arm, biological information such as a heartbeat, and the like) may also be used as a feature. Each feature is converted into a numerical value within a predetermined range and given to each neuron of the input layer as a feature amount. Hence, the input layer needs to have neurons as many as the number of feature amounts to be used. Furthermore, in this embodiment, a plurality of learning models learned using a neural network are prepared and selectively used in accordance with the situation. The selective use of the plurality of learning models will be described later.

Note that in the judgment based on the neural network, when the bonding weight between the neurons is changed by learning processing to be described later, the output value changes, and the result of judgment can be adapted to the learning result.

In addition, the determination of automatic image capturing also changes depending on the activation condition of the Main processor loaded in S702 of FIG. 7. For example, if the Main processor is activated by tap detection or a specific voice command, the possibility that the user has performed the operation because he/she currently wants image capturing is very high. Hence, a setting is done to increase the image capturing frequency.

In S909, if the determination to perform image capturing is made by the automatic image capturing determination in S908, the process advances to S910. If the determination is not made, the process advances to the end of image capturing mode processing.

In S910, image capturing is started. At this time, auto focus control by the focus drive control circuit 204 is performed. In addition, exposure control to obtain an appropriate brightness of the object is performed using a stop control circuit, a sensor gain control circuit, and a shutter control circuit (neither are shown). After the image capturing, various kinds of image processing such as auto white balance processing, noise reduction processing, and gamma correction processing are performed by the image processing circuit 207 to generate an image.

Note that a means for performing image capturing after the image capturing apparatus notifies the person as the subject to be imaged that image capturing is performed when predetermined conditions are satisfied at the time of image capturing may be employed. As the method of notification, for example, a voice from the voice output circuit 218 or LED lighting by the LED control circuit 224 may be used. Alternatively, a motion operation for visually guiding the line of sight of the object may be performed by pan/tilt driving. The predetermined conditions are, for example, the number of faces in the field angle, the degree of smile/degree of eye closing in faces, the angle of the line of sight or face of an object person, a face authentication ID number, the number of persons registered for personal authentication, and the like. In addition, a generic object recognition result at the time of image capturing, a scene discrimination result, the time elapsed from the preceding image capturing, the image capturing time, whether the current position based on GPS position information is a scenic spot or not, the voice level at the time of image capturing, the presence/absence of a person who utters a voice, clap, whether there is a shout for joy or not, and the like are used. Vibration information (acceleration information and the state of the image capturing apparatus), environmental information (temperature, atmospheric pressure, illuminance, humidity, and UV light amount), and the like are also used. When notification image capturing is performed based on these conditions, an image with a preferable line of sight to the camera can be left in an important scene.

A plurality of predetermined conditions may be prepared. According to the conditions, the voice may be changed, the LED lighting method (color or blinking time) may be changed, or the pan/tilt motion method (the way to move and the driving speed) may be changed.

In S911, editing processing of processing the image generated in S910 or adding the image to a moving image is performed. More specifically, the image processing is, for example, trimming processing based on the face of a person or the focus position, image rotation processing, an HDR (High Dynamic Range) effect, a blur effect, a color conversion filter effect, or the like. In the image processing, based on the image generated in S910, a plurality of images may be generated by combining the above-described processes and saved separately from the image generated in S910. As for moving image processing, processing of adding a captured moving image or still image while applying special effect processing such as slide, zoom, and fade to a generated edited moving image may be performed. As for editing in S911 as well, the method of image processing may be determined by judging, based on the learning model, the information of the captured image or various kinds of information detected before the image capturing. The determination conditions of the determination processing can be changed by learning processing to be described later.

In S912, learning information generation processing for the captured image is performed. Here, learning information to be used in learning processing to be described later is generated from the control parameters at the time of image capturing or the analysis result of the captured image and recorded. More specifically, the learning information includes the zoom magnification at the time of image capturing in the current captured image, a generic object recognition result at the time of image capturing, a face detection result, the number of faces captured in the image, the degree of smile/degree of eye closing in faces, a face authentication ID number, the angle of line of sight of an object person, and the like. The learning information also includes a scene discrimination result, the time elapsed from the preceding image capturing, the image capturing time, GPS position information and a change amount from the preceding image capturing position, the voice level at the time of image capturing, a person who utters a voice, clap, whether there is a shout for joy or not, and the like. The learning information also includes vibration information (acceleration information and the state of the image capturing apparatus), environmental information (temperature, atmospheric pressure, illuminance, humidity, and UV light amount), the moving image capturing time, whether an image is captured by a manual image capturing instruction or not, and the like. In addition, a score that is the output of a learning model representing the user's preference to an image as a numeral value is also calculated.

These pieces of information are generated and recorded as tag information in a captured image file. Alternatively, the pieces of information may be written in the nonvolatile memory 216 or may be saved in the recording medium 221 as so-called catalog data in a list format of information of each captured image.

In S913, if the image capturing in S910 is manual image capturing, the process advances to S914. If the image capturing is automatic image capturing, the process advances to S915.

In S914, a learning model is selected from a plurality of learning models based on the learning information created in S912. That is, in some cases, switching of the learning model is performed in S914. Switching the learning model means changing parameters such as the numbers of nodes in the input layer 1001, the intermediate layer 1003, and the output layer 1004 shown in FIG. 10, the feature amount represented by each node, the activation function (not shown) of each node, the weight coefficient of each bond 1002 that connects the nodes, the number of layers in the intermediate layer 1003, and the like. These parameters are obtained by reading them out from the nonvolatile memory 216 or the recording medium 221 or by acquiring them from the outside via the communication circuit 222. Alternatively, a plurality of learning processing circuits 219 on which different machine learnings are reflected may be provided, and switching may be done between the pieces of hardware.

In the subsequent automatic image capturing processing, the selected learning model is used. The learning model selection is performed only in manual image capturing because manual image capturing is performed according to the user's intention, and therefore, the possibility that it reflects an object of the user's preference, a scene of the preference, or a place or time interface of the preference is very high. Hence, when the learning model is switched based on the learning information obtained by manual image capturing, the possibility that automatic image capturing reflecting the user's preference at that time can be performed becomes high.

The learning model selection in S914 is performed using, for example, one of the following three methods.

As the first method, switching is performed using a scene recognition technology. For example, if scenes "portrait", "sport", and "landscape" can be recognized by a known technique,
learning model for portrait
learning model for sport
learning model for landscape
are provided. If the scene changes, a photo to be taken often changes. For example, when capturing a portrait, the texture of a human skin or hair should be reproduced. Hence, the image capturing should be performed at a moment with less motion of an object (a moment at which an object blur is small). In addition, when capturing a sport, a photo of a lively motion should be taken. Hence, the image capturing should be performed at a moment with a motion of an object. Each learning model learns the user's preference using supervised data captured in a target scene and is configured to have a different tendency to execute automatic image capturing.

A learning model corresponding to the scene discrimination result included in the learning information generated in S912 is selected. In the subsequent automatic image capturing, the selected learning model is used. Accordingly, automatic image capturing according to the scene of each time is performed.

Note that the timing to perform scene recognition is not limited to the timing to S912 and may be set either before or after the image capturing. For example, scene recognition may be performed in the image recognition processing of S901. Note that the scene recognition is not limited to the three scenes described above. Any scene recognizable by a known technique can be used and, for example, a night scene, macro, pet, night scene portrait, baby, backlight, and the like can be considered.

As the second method, switching is performed using a geotag representing position information. If the place changes, an object to be captured may change. For example, near the home, the user wants to capture an image of a child who is smiling, and
near a park, the user wants to capture an image of a child who is playing a sport with a serious look.

Figure 12:
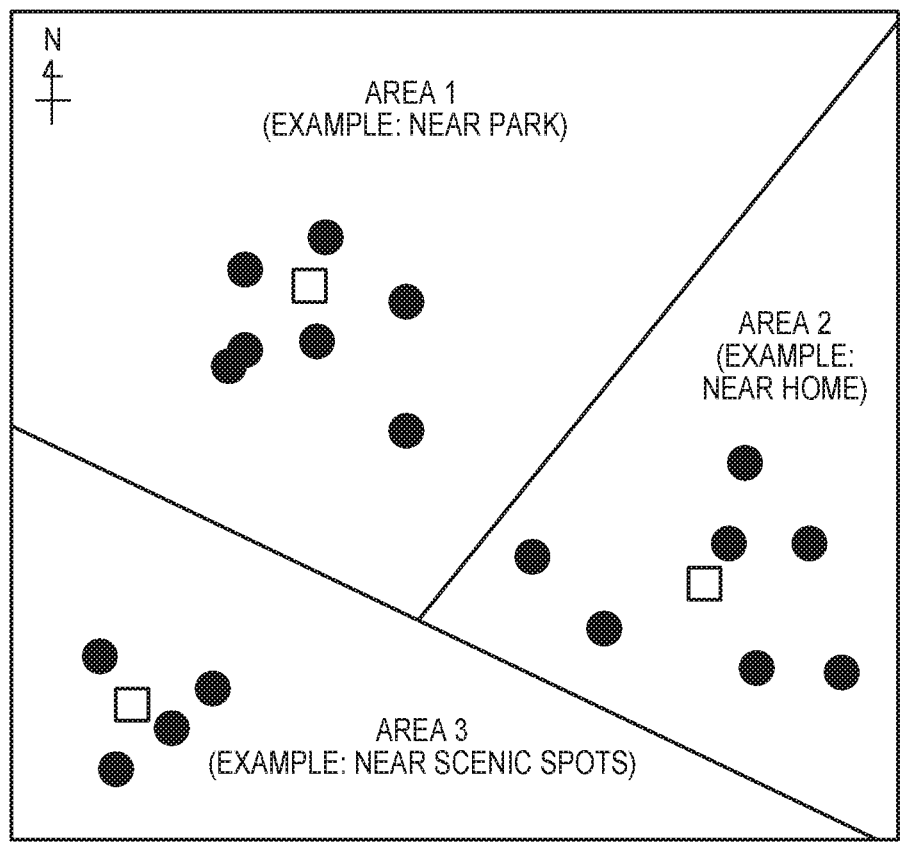
FIG. 12 is a view for explaining mapping of geotags.

To cope with the change in preference depending on a place, learning models according to places are provided. The structures of these learning models will be described with reference to FIG. 12. FIG. 12 shows a map on which mapping (geotag acquisition) of positions where manual image capturing was performed is performed based on geotags. Each full circle represents a position where manual image capturing was performed. Learning is performed based on images obtained by the manual image capturing, and a plurality of neural networks are formed for the areas. Alternatively, images with geotags may be acquired from a network, and a plurality of neural networks for the areas may be formed. The learning method is as described above, and the images to be used for the learning are classified and used for each area. An example of the classification learning method will be described below:

Assume that pieces of learning information generated in S912 are classified into a predetermined number k of classes based on geotags. As a classification algorithm, a known algorithm can be used. For example, k-means, the graph cut method, or the like can be used. The pieces of learning information can thus be classified into classes 1, 2, . . . , k (on a class basis). Learning is performed based on each of the k pieces of learning information to form k neural networks, and learning models are generated. Here, a center position (the average value of pieces of geotag information in each class) is obtained in each class. Each open square in FIG. 12 represents a center position. The learning timing is not limited and may be set before or after the image capturing or during standby of the camera.

When the process advances to S914, the distance between the geotag of an image obtained by the immediately preceding manual image capturing and the center position of each class is calculated, and which class is the closest is calculated. Then, the learning model is switched to the learning model of the closest class, and from then on, the learning model is used in the automatic image capturing. Accordingly, automatic image capturing based on the current area is performed. Note that the classification method is not limited to the above-described method, and an algorithm such as a support vector machine may be used. In this case, discriminators for the classification of learning information and the judgment of neural network switching are generated by one algorithm.

As the third method, a score is obtained by passing the learning information obtained in S912 through each learning model, and a learning model is selected based on the score. In this method, independently of a scene or place, the learning model can be switched based on various parameters that can be acquired from the camera. In addition, automatic image capturing coping with both a user's unchangeable preference and a preference that changes each time can be performed. As an application example, if a user considers that a photo of his/her family is preferable in any situation (unchangeable preference), but the preferred composition or image capturing environment for the photo of the family changes each time (preference of each time), automatic image capturing suitable for both preferences can be provided to the user.

Figure 13:
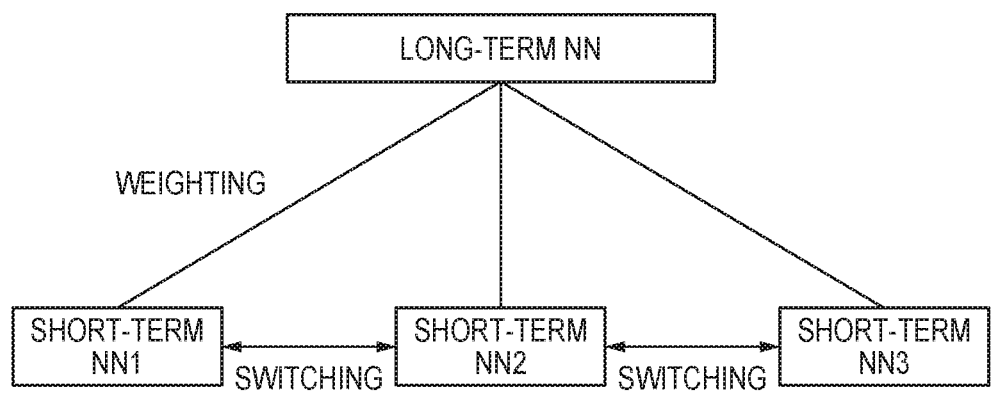
FIG. 13 is a view for explaining the structure of a long-term learning model and short-term learning models.

FIG. 13 shows a detailed method. The learning models include a long-term learning model and a short-term learning model. There exist one long-term learning model and a plurality of short-term learning models (three short-term learning models in FIG. 13). The long-term learning model uses, as supervised data, learning information generated from images manually captured in a long period. The long-term learning model learns the user's preference in a long term and can therefore be said to learn the user's unchangeable preference based on various scenes. On the other hand, the short-term learning model uses, as supervised data, learning information generated from images manually captured in a short period. The short-term learning model learns the user's preference in a short term and can therefore be said to reflect a preference of each time depending on a situation, place, mood, time zone, date, season, or the like.

Upon determining in S913 that the image capturing is manual image capturing, in S914, each short-term learning model is evaluated, and the short-term learning model is switched to the short-term learning model of the highest evaluation at that time. The evaluation method is as follows.

The learning information acquired in S912 is passed through each short-term learning model, the score and the supervised value of the learning information are compared, and the short-term learning model having the smallest difference is selected. The supervised data of learning information generated from an image obtained by manual image capturing is estimated to represent a scene of a user's preference and is therefore given a predetermined high value. The learning model that outputs a score with a small difference from the supervised data is selected, thereby switching the learning model to a learning model that estimates the degree of preference at that time well. Hence, automatic image capturing suitable for the user's preference can be performed.

Figure 14:
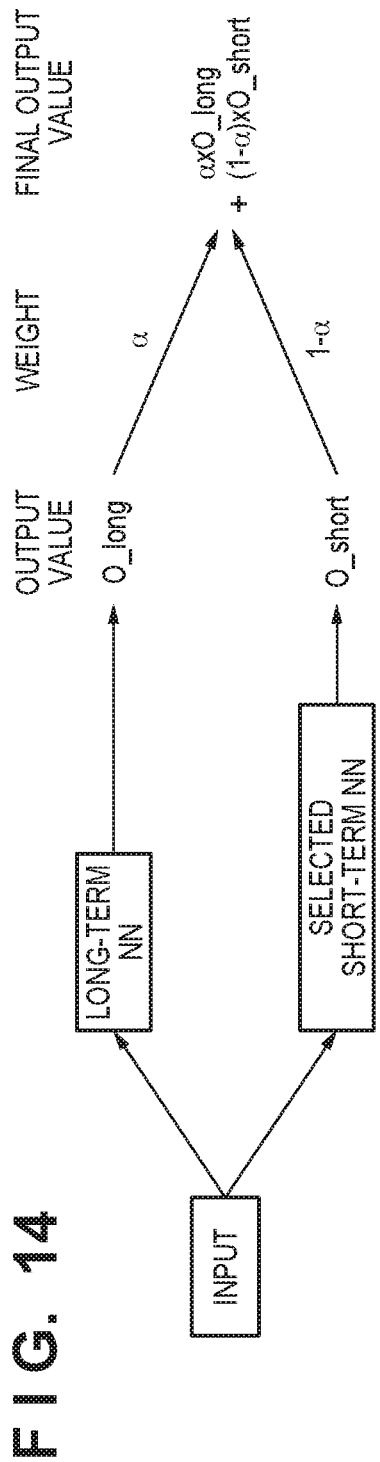
FIG. 14 is a view for explaining integration of the long-term learning model and the short-term learning models.

Note that when performing automatic image capturing determination using the long-term learning model and the short-term learning models in S908, the score of the long-term learning model and the score of the selected short-term learning model are weighted and added (integrated) to acquire the final score, and it is determined based on the score whether to perform automatic image capturing. FIG. 14 shows the method of calculating the final score. Each of the long-term learning model and the selected short-term learning model shown in FIG. 14 is a multilayer perceptron as shown in FIG. 10. An object captured in the current field angle corresponding to the input layer and a feature amount based on the scene or the state of the camera are input to each learning model. Let O_long be the score of the long-term learning model, and O_short be the score of the short-term learning model. A weight $\alpha$ ($0 \leq \alpha \leq 1$) is added to each score, and the scores are added. O_final given by $$O\_final = \alpha \times O\_long + (1-\alpha) \times O\_short \quad (1)$$

is obtained as the final score.

In equation (1), when $\alpha$ is made large, automatic image capturing with emphasis on the unchangeable user's preference is performed. When $\alpha$ is made small, automatic image capturing with emphasis on the preference of each time is performed. It is also possible to correct $\alpha$ every time manual image capturing is performed. If the user obtains many images by manual image capturing in a specific situation, he/she can be regarded to be interested in the image capturing there. In automatic image capturing as well, when the weight of the short-term learning model corresponding to the situation is made large, image capturing conforming to the interest better can be performed. A calculation method of a for this purpose is represented by $$\alpha = \alpha - k \times err \quad (2)$$

where err is the error between the final score and the supervised data value of learning information that is the input at that time. In equation (2), err is appropriately normalized so a does not become smaller than 0, k is a coefficient representing the follow-up capability to the current situation. The larger k is, the smaller $\alpha$ is. Since the tendency to place emphasis on the short-term learning model becomes strong, the follow-up capability rises. To the contrary, not to reflect the situation on the automatic image capturing so much, the initial value of $\alpha$ is made close to 1, and k is made smaller.

Differentiation between the long-term learning model and the short-term learning model can be implemented by changing the upper limit of the amount of learning information serving as supervised data. If the amount of learning information of the long-term learning model is larger than that of the short-term learning model, the long-term learning model can perform learning using learning information of various scenes acquired during a longer period, and can learn the unchangeable user's preference better. The differentiation can also be implemented by changing not the upper limit of the amount of learning information but the learning information acquisition frequency. The acquisition frequency of the long-term learning model is set to be smaller than that of the short-term learning model. For example, even if learning information is acquired by manual image capturing, the learning information is registered only once in M times (M is a natural number of 2 of more) for the long-term learning model. In this case, the amount of learning information hardly reaches the upper limit in the long-term learning model, and consequently, old learning information can be left.

The differentiation is needed between the plurality of short-term learning models as well. This is because the short-term learning models need to be specialized to different situations or moods. As the short-term learning models, several NNs learned in advance in a representative situation may be used as predetermined short-term learning models. In addition, the short-term learning models may be formed using learning information acquired by manual image capturing of the user. The forming method will be described below.

When the user has initially purchased a camera, the number of captured images is small, and the number of pieces of learning information is small. For this reason, until a predetermined number of pieces of learning information are collected, the short-term learning models are not used, and the automatic image capturing determination is performed using only the long-term learning model. When the predetermined number of pieces of learning information are collected, clustering of the pieces of learning information is performed into a predetermined number of clusters (=the number of short-term learning models to be created). The clustering algorithm is a known method such as k-means. As a feature vector serving as a key of clustering, the same vector as the feature amount of the input layer of the short-term learning model can be used. As the result of clustering, a plurality of classes in each of which pieces of similar learning information are collected can be formed. The classes have different features. Learning is performed using the learning information group of each class, and a plurality of short-term learning models are created. The plurality of short-term learning models having different features are thus created. As an example of differentiation of the short-term learning models, for example, when "the number of objects" is included in the feature vector of clustering, and two classes are created, short-term learning model 1 for a case in which "there are many objects" and short-term learning model 2 for a case in which "there are less objects" are created.

In addition, the clustering may be performed in consideration of the contribution ratio of each feature amount. The contribution ratio is taken into consideration because the feature amounts do not have equal influences on the user's preference. When emphasis is placed on the feature amount that largely contributes to the user's preference, differentiation of the short-term learning models can be performed from the viewpoint of the user. For weighting of the feature amounts, the information of the network configuration of the long-term learning model is used.

Figure 15:
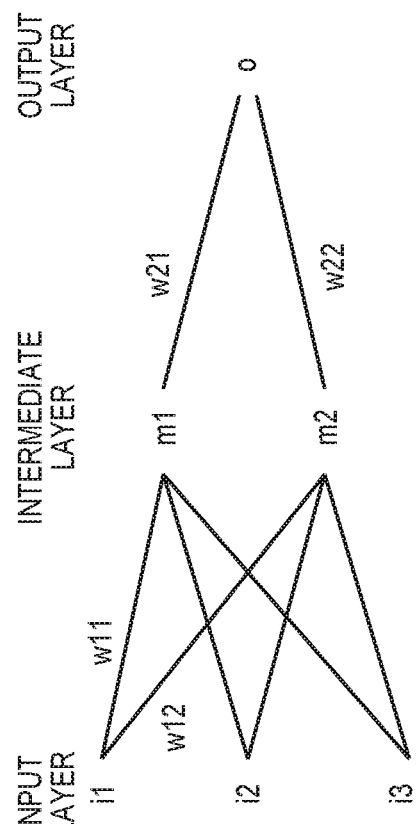
FIG. 15 is a view for explaining the arrangement of the long-term learning model.

For the descriptive convenience, FIG. 15 shows an example of a long-term learning model in which the number of feature amounts in the input layer is three (i1, i2, and i3), and one intermediate layer exists. w11 to w22 are weights between nodes (some are not shown). When the weight is large, the degree of contribution to the output (user's preference) is large. A contribution ratio $c\_i1$ to the feature amount i1 is the product sum of the weights between the nodes through which the route from i1 to O passes and can be defined by $$c\_i1 = w11 \times w21 + w12 \times w22 \qquad (3)$$

$c\_i2$ and $c\_i3$ that are contribution ratios to i2 and i3 can also be calculated in a similar manner. However, the weight between the nodes is not illustrated. When these contribution ratios are used, the feature vectors serving as the key of the clustering of the learning information are ($c\_i1 \times i1$, $c\_i2 \times i2$, $c\_i3 \times i3$). Note that even when the number of dimensions of the feature vector (the number of nodes of the input layer) increases, or the number of layers of the intermediate layer increases, the contribution ratio can similarly be obtained by the product sum of the weights between the nodes of the route from a node of the input layer to the output layer. A plurality of short-term learning models differentiated by a feature in which the user is interested can thus be created.

Note that the above-described three switching methods have been explained concerning a case in which a predetermined number of learning models are provided in advance or a case in which a predetermined number of learning models are created at once at a predetermined timing. However, the number of learning models may be increased/decreased at any time. For example, when concentratedly switching to a specific learning model, the situation can be considered as a situation which the user is particularly interested in. For this reason, the learning used for the learning of the learning model may be divided and re-learned to divide the learning model into a plurality of learning models. This can cope with a finer situation.

Conversely, a learning model that has not been used for a predetermined period may be deleted. This makes it possible to reduce the capacity to store the learning models or learning information. In addition, when a predetermined number of pieces of learning information whose features are different from those of existing learning models are acquired, a learning model may be added. For example, in the second switching method, when image capturing is performed in a place far apart from each center position of a geotag by a predetermined distance, the number of classes is incremented by one, and clustering of the learning information is re-executed to reconstruct the learning models. In the third switching method, when new learning information is acquired, and the difference between the score from each short-term learning model of the device shake detection circuit and the supervised value is a predetermined value or more, one short-term learning model is added. The added short-term learning model performs learning using these pieces of learning information.

Note that in the above description, selection or switching of the learning model is perfumed based on learning information generated from captured images. However, the learning model may be switched based on an image in the camera or determination value information that the user has input to an image using a dedicated parameter in the external apparatus 301 after image capturing. Here, if the user gives a predetermined high point (evaluation point) to an image that he/she prefers, the selection processing of S914 may be executed using the learning information of the image as supervised data. However, since the switching is done based on past images, the possibility that the learning model reflects the situation or mood at that time becomes lower than that at the time of image capturing. Hence, a predetermined threshold may be provided to determine how old a past image is, and if the past image is older than the predetermined threshold, the processing of S914 may be inhibited.

In this embodiment, since a plurality of learning models are provided, information (ID information or the like) representing the learning model that has used learning information for learning is given to learning information acquired in the past. To newly acquired learning information, the ID information of the learning model switched in S1702 is given. Accordingly, when executing the learning mode next, learning information acquired after the preceding learning is used for the learning of the corresponding learning model.

In S915, past image capturing information corresponding to the learning model selected at that time is updated. More specifically, for the number of captured images for each area described in S908, the number of captured images for each person registered for personal authentication, the number of captured images for each object recognized by generic object recognition, and the number of captured images for each scene of scene discrimination, the count of the number corresponding to the current captured image is incremented by one.

<Learning Mode Processing>

Learning according to the user's preference according to this embodiment will be described next.

In this embodiment, using a neural network as shown in FIG. 10 and a machine learning algorithm, the learning processing circuit 219 performs learning according to the user's preference, thereby generating a learning model. The learning processing circuit 219 uses, for example, Jetson TX2 available for NVIDIA. The neural network is used to predict an output value from an input value. When the actual value of an input value and the actual value of an output value are learned in advance, an output value can be estimated in correspondence with a new input value. Learning according to the user's preference is performed for the above-described automatic image capturing or object search by using the neural network.

In addition, object registration (face authentication, generic object recognition) that becomes feature data to be input to the neural network is also registered.

In this embodiment, elements to be learned by the learning processing are as follows.

(1) Automatic Image Capturing

Learning for automatic image capturing will be described. In automatic image capturing, learning for automatically capturing an image according to the user's preference is performed. As described above in the explanation using the procedure shown in FIG. 9, learning information generation processing is performed after image capturing (S912). An image to be learned is selected by a method to be described later, and the weight of the neural network is changed based on learning information included in the image, thereby performing learning.

(2) Automatic Editing

Learning for automatic editing will be described. In automatic editing, learning is performed for editing immediately after image capturing in S911 of FIG. 9. The editing immediately after image capturing will be described. An image to be learned is selected by a method to be described later, and the weight of the neural network is changed based on learning information included in the image, thereby performing learning. Various kinds of detection information obtained by image capturing or by information immediately before the image capturing are input to the neural network, and the editing method (trimming processing, image rotation processing, HDR (High Dynamic Range) effect, blur effect, color conversion filter effect, or the like) is determined.

(3) Object Search

Learning for an object search will be described. In the object search, learning for automatically searching for an object according to the user's preference is performed. As described above in the explanation using the procedure shown in FIG. 9, in the object search processing (S904), the importance level of each area is calculated, pan/tilt and zoom driving is performed, and the object search is performed. The learning is performed by learning based on the captured image or detection information during the search and changing the weight of the neural network. Various kinds of detection information during the search operation are input to the neural network, the importance level is calculated, and the pan/tilt angle is set based on the importance level, thereby performing the object search on which the learning is reflected. Other than the setting of the pan/tilt angle based on the importance level, for example, learning of pan/tilt driving (speed, acceleration, and frequency to move) is performed.

(4) Object Registration

Learning for object registration will be described. In the object registration, learning for automatically performing registration or ranking of an object according to the user's preference is performed. As the learning, for example, face authentication registration, registration of generic object recognition, and registration of a gesture, voice recognition, or scene recognition by a sound are performed. In authentication registration, authentication registration for persons and objects is performed, and ranks are set based on the count and frequency of image acquisition, the count and frequency of manual image capturing, and the frequency of appearance of an object under a search. The pieces of registered information are registered as input of determinations using each neural network.

The learning method will be described next.

As the learning method. "learning in the image capturing apparatus" and "learning by cooperation with a communication device" exist.

The method of learning in the image capturing apparatus will be described below.

For the learning in the image capturing apparatus according to this embodiment, the following methods exist.

(1) Learning Based on Detection Information at Time of Image Capturing Instruction by User As described above concerning S907 to S913 in FIG. 9, in this embodiment, the image capturing apparatus 101 can perform two types of image capturing, that is, manual image capturing and automatic image capturing. If an image capturing instruction by a manual operation (performed based on three determinations, as described above) is input in S907, information representing that the captured image is an image manually captured is added in S912. If image capturing is performed after it is determined in S909 that automatic image capturing is ON, information representing that the captured image is an image automatically captured is added in S912.

Here, when performing manual image capturing, the possibility that the image is captured based on an object of the user's preference, a scene of the preference, and a place or time interval of the preference is very high. Hence, learning based on each feature data obtained at the time of manual image capturing or the learning information of the captured image is performed.

In addition, based on the detection information at the time of manual image capturing, learning is performed concerning extraction of a feature amount in the captured image, registration of personal authentication, registration of the expression of each person, and registration of combinations of persons. Furthermore, based on the detection information at the time of object search, for example, learning to change the importance of a nearby person or object is performed based on the expression of an object that has undergone personal registration.

(2) Learning Based on Detection Information at Time of Object Search

During the object search operation, a person, an object, and a scene captured simultaneously with the object that has undergone personal authentication registration are determined, and the ratio of time in which they are simultaneously captured in the field angle is calculated.

For example, if the ratio of time in which a person A as a personal authentication registration object is captured simultaneously with a person B as a personal authentication registration object is higher than a predetermined threshold, the importance can be determined to be high. For this reason, if the person A and the person B are captured in the field angle, various kinds of detection information are saved as learning data such that the score of automatic image capturing determination becomes high, and learning is performed in learning mode processing 716.

In another example, if the ratio of time in which the person A as a personal authentication registration object is captured simultaneously with an object "cat" determined by generic object recognition is higher than a predetermined threshold, the importance can be determined to be high. For this reason, if the person A and the "cat" are captured in the field angle, various kinds of detection information are saved such that the score of automatic image capturing determination becomes high. Then, learning is performed in the learning mode processing 716.

As described above, when the frequency of appearance of an object under the search is high, the score of automatic image capturing determination is set high. Accordingly, the importance of a person or object near an object that has undergone personal authentication registration can be changed to a higher level.

In addition, when the degree of smile or expression of the person A as a personal authentication registration object is detected, and "joy", "surprise", or the like is detected, processing of learning is performed such that the importance level of a simultaneously captured object becomes high. Also, when an expression of "anger", "serious look", or the like is detected, the possibility that a simultaneously captured object is important is low. Hence, processing of, for example, inhibiting learning is performed.

Learning by cooperation with an external communication device according to this embodiment will be described next.

For the learning by cooperation with an external communication device according to this embodiment, the following methods are usable.

(3) Learning Performed when External Communication Device Acquires Image

As described with reference to FIG. 3, the image capturing apparatus 101 and the external device 301 include communication means of the communications 302 and 303. Image transmission/reception is mainly performed by the communication 302, and the external device 301 can acquire an image in the image capturing apparatus 101 by communication via a dedicated application in the external device 301. In addition, the thumbnail images of image data saved in the image capturing apparatus 101 can be browsed via a dedicated application in the external device 301. This allows the user to select his/her favorite image from the thumbnail images, confirm the image, and operate an image acquisition instruction, thereby causing the external device 301 to acquire the image.

At this time, since the user selects the image and instructs transmission to acquire the image, the possibility that the acquired image is an image of the user's preference is very high. Hence, it is determined that the acquired image is an image to be learned, and various kinds of learning of the user's preference can be performed by performing learning based on the learning information of the acquired image.

Figure 18:
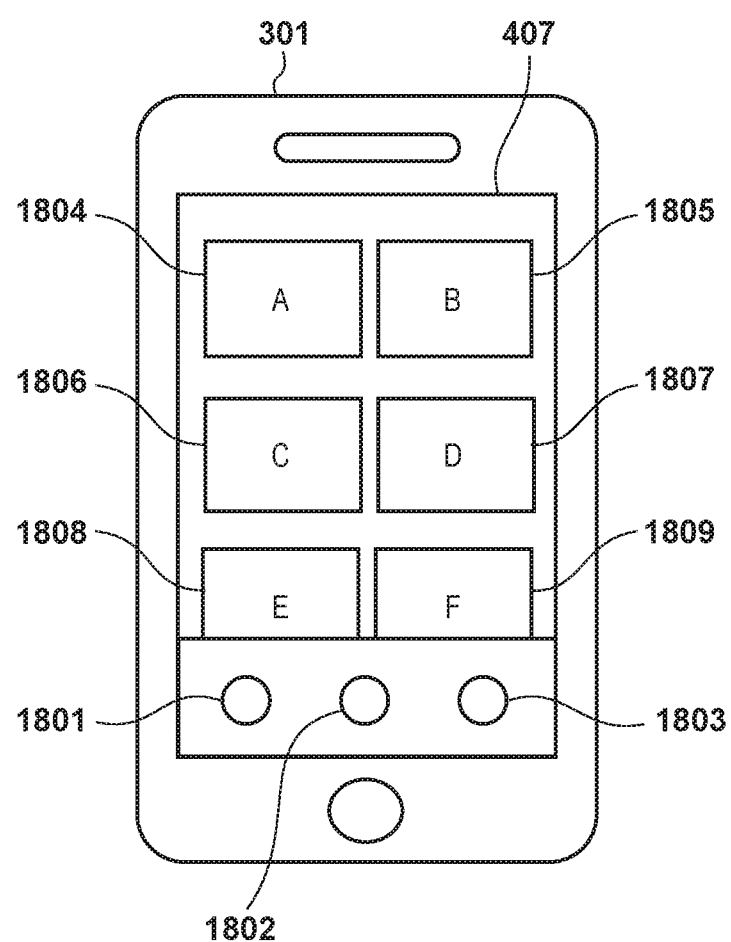
FIG. 18 is a view for explaining display processing according to this embodiment.

An example of the operation will be described. FIG. 18 shows an example in which images in the image capturing apparatus 101 are browsed via a dedicated application in the external device 301 that is a smart device. Thumbnail images 1804 to 1809 of image data saved in the image capturing apparatus are displayed on the display device 407. The user can select and acquire his/her favorite image. At this time, display method change units 1801, 1802, and 1803 configured to change the display method are provided. When the display method change unit 1801 is pressed, the display order is changed to a date/time priority display mode, and the images are displayed on the display device 407 in the order of image capturing dates/times of the images in the image capturing apparatus 101 (for example, the image 1804 is displayed with a late date/time, and the image 1809 is displayed with an early date/time). When the display method change unit 1802 is pressed, the display order is changed to a recommenced image priority display mode. Based on the score calculated by determining the user's preference for each image in S912 of FIG. 9 the images are displayed on the display device 407 in descending order of scores of the images in the image capturing apparatus 101 (for example, the image 1804 is displayed with a high score, and the image 1809 is displayed with a low score). When the display method change unit 1803 is pressed, persons or objects can be designated. When a specific person or object is designated next, only the specific object can be displayed.

The display method change units 1801 to 1803 can also simultaneously turn on the settings. For example, when all the settings are ON, only designated objects are displayed, images of late image capturing dates/times are preferentially displayed, and images of high scores are preferentially displayed.

As described above, the user's preference is learned for the captured images as well. It is therefore possible to easily extract only images of the user's preference from an enormous number of captured images by a simple confirmation operation.

(4) Learning Performed when Determination Value is Input to Image Via External Communication Device As described above, the image capturing apparatus 101 and the external device 301 include communication means, and images saved in the image capturing apparatus 101 can be browsed via a dedicated application in the external device 301. Here, the user may give a score to each image. The user gives a high score (for example, 5 points) to an image he/she likes or gives a low score (for example, 1 point) to an image he/she does not like. The image capturing apparatus learns by the operation of the user. The score is used, together with learning information, for relearning in the image capturing apparatus. The learning is performed such that the output of the neural network to which feature data from designated image information is input becomes close to a score designated by the user.

In this embodiment, the user inputs a determination value to a captured image via the communication device 301. However, the user may directly input a determination value to an image by operating the image capturing apparatus 101. In this case, for example, a touch panel display is provided on the image capturing apparatus 101, and the user presses a GUI button displayed on the touch panel display screen display device to set a mode to display a captured image. Then, the user inputs a determination value to each image while confirming the captured image. The same learning as described above can be performed by this method.

(5) Learning Performed when Parameters are Changed by External Communication Device As described above, the image capturing apparatus 101 and the external device 301 include communication means, and learning parameters currently set in the image capturing apparatus 101 can be communicated to the external device 301 and saved n the storage circuit 404 of the external device 301. As the learning parameters, for example, the weight of the neural network, selection of an object to be input to the neural network, and the like can be considered. In addition, via a dedicated application in the external device 301, learning parameters set in a dedicated server can be acquired via the public network control circuit 406 and set as learning parameters in the image capturing apparatus 101. Accordingly, when the parameters at a certain point of time are saved in the external device 301 and set in the image capturing apparatus 101, the learning parameters can be returned. In addition, the learning parameters held by another user can be acquired via a dedicated server and set in the image capturing apparatus 101 of the user himself/herself.

A learning processing sequence will be described next.

When it is determined whether to perform learning processing in the mode setting determination in S704 of FIG. 7, and learning processing is performed, the mode is determined to be a learning mode, and learning mode processing in S712 is performed.

Figure 16:
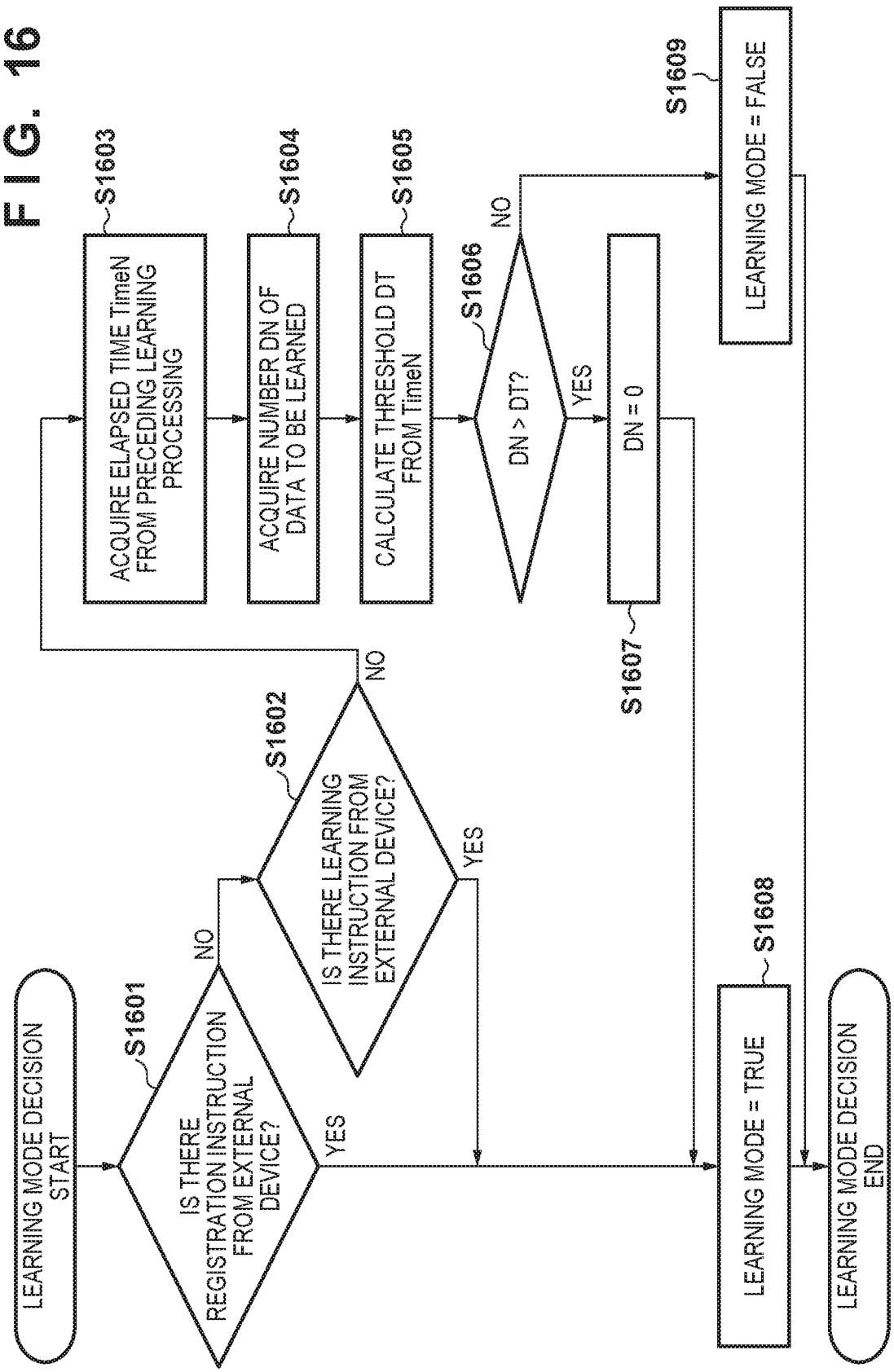
FIG. 16 is a flowchart for explaining learning mode determination.

The determination conditions of the learning mode will be described. Whether to transit to the learning mode is determined based on the time elapsed from preceding learning processing, the number of pieces of information usable in learning, whether a learning processing instruction is input via a communication device, and the like. FIG. 16 shows a determination processing procedure of determining whether to transit to the learning mode, which is performed in the mode setting determination processing of S704.

When the start of learning mode determination is instructed in the mode setting determination processing of S704, the processing shown in FIG. 16 starts. In S1601, it is determined whether a registration instruction from the external device 301 is input. As for the registration here, it is determined whether a registration instruction to perform the above-described learning is input. For example, there are <learning performed based on image information of image acquired by communication device> and <learning performed when determination value is input to image via communication device>. If a registration instruction from the external device is input in S1601, the process advances to S1608 to set the learning mode determination to TRUE and do a setting to perform the process of S712. If a registration instruction from the external device is not input in S1601, the process advances to S1602. In S1602, it is determined whether a learning instruction from the external device is input. As for the learning instruction here, it is determined whether an instruction to set a learning parameter is input, as in <Learning Performed When Image Capturing Apparatus Parameter Is Changed by Communication Device>. If a learning instruction from the external device is input in S1602, the process advances to S1608 to set the learning mode determination to TRUE and do a setting to perform the process of S712, and the learning mode determination processing is ended. Note that in both the case in which the registration instruction from the external device is received and the case in which the learning instruction from the external device is received, the learning mode determination for the learning model selected at that time is set to TRUE. However, the present invention is not limited this if the registration instruction from the external device or the learning instruction from the external device includes an instruction to designate the neural network as the learning target. If a learning instruction from the external device is not input in S1602, the process advances to S1603.

In S1603, in the learning model selected at that point of time, an elapsed time TimeN from preceding learning processing (recalculation of the weight of the neural network) is acquired, and the process advances to S1604. In S1604, the number DN of new data to be learned (the number of images designated to be learned in the elapsed time TimeN from the preceding learning processing) is acquired, and the process advances to S1605. In S1605, a threshold DT is acquired from TimeN. For example, a threshold DTa in a case in which TimeN is smaller than a predetermined value is set to be larger than a threshold DTb in a case in which TimeN is larger than the predetermined value, and the threshold is set to become smaller as the time elapses. Even in a case in which the number of learning data is small, learning is performed again when the time elapse is large. This allows the image capturing apparatus to easily change learning in accordance with the use time.

When the threshold DT is calculated in S1605, the process advances to S1606 to determine whether the number DN of data to be learned is larger than the threshold DT. If DN is larger than the threshold DT, the process advances to S1607 to set DN to 0. After that, the process advances to S1608 to set the learning mode determination to TRUE and do a setting to perform the process of S712, and the learning mode determination processing is ended.

If DN is equal to or smaller than the threshold DT in S1606, the process advances to S1609. Since neither the registration instruction from the external device nor the learning instruction from the external device is input, and the number of learning data is equal to or smaller than the predetermined value, the learning mode determination is set to FALSE, a setting is done not to perform the process of S712, and the learning mode determination processing is ended.

Figure 17:
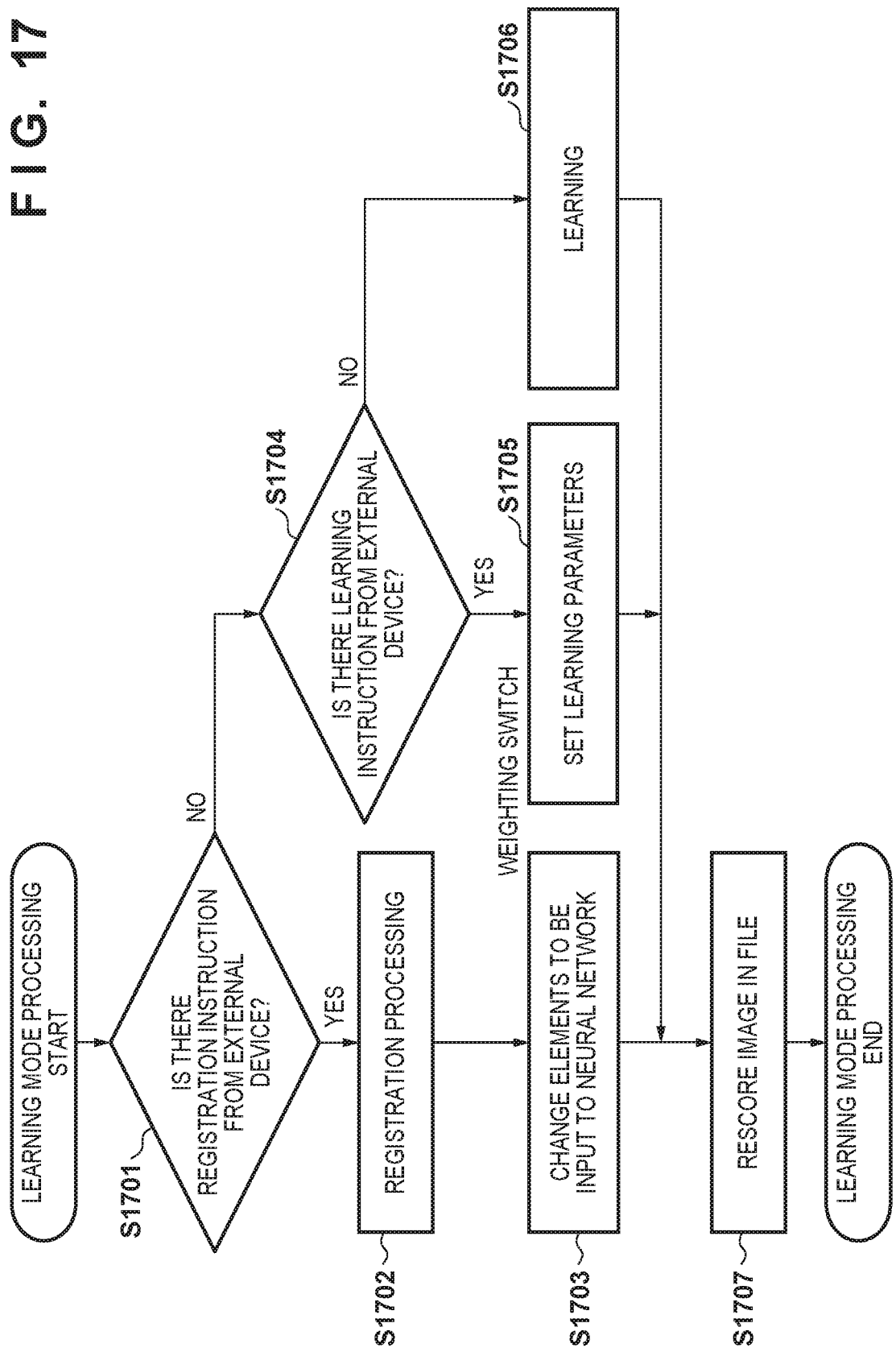
FIG. 17 is a flowchart for explaining learning processing.

Processing in the learning mode processing (S712) will be described next. FIG. 17 shows a detailed procedure of the learning mode processing.

When it is determined in S711 of FIG. 7 that the mode is the learning mode, and the process advances to S712, the processing shown in FIG. 17 starts. In S1701, it is determined whether a registration instruction from the external device 301 is input. If a registration instruction from the external device is input in S1701, the process advances to S1702. In S1702, various kinds of registration processing are performed.

The various kinds of registration processing are registration of features to be input to the neural network and include, for example, registration of face authentication, registration of generic object recognition, registration of sound information, registration of location information, and the like.

When the registration processing ends, the process advances to S1703 to change elements to be input to the neural network based on the information registered in S1702.

When the process of S1703 ends, the process advances to S1707.

If a registration instruction from the external device is not input in S1701, the process advances to S1704 to determine whether a learning instruction from the external device 301 is input. If a learning instruction from the external device is input, the process advances to S1705 to set learning parameters communicated from the external device to determination devices (the weight of the neural network and the like), and the process then advances to S1707.

If a learning instruction from the external device is not input in S1704, learning (recalculation of the weight of the neural network) is performed in S1706. The start of the process to S1706 is the condition to perform relearning of each determination device because the number DN of data to be learned exceeds the threshold, as described with reference to FIG. 16. The relearning is performed using a method such as back propagation or gradient descent, the weight of the neural network is recalculated, and the parameters of the determination devices are changed. When the learning parameters are set, the process advances to S1707.

In S1707, rescoring of each image in the file is performed. In this embodiment, scores are given to all captured images saved in a file (recording medium 221) based on the learning result, and automatic editing or automatic file deletion is performed in accordance with the given scores. Hence, when the learning parameters are set by relearning or from the external device, the scores of the captured images also need to be updated. Hence, in S1707, recalculation for giving new scores to the captured images saved in the file is performed. When the processing ends, the learning mode processing is ended.

Note that in this embodiment, the description has been made based on the arrangement that performs learning in the image capturing apparatus 101. However, the same learning effect as described above can be implemented by an arrangement that provides the learning processing on the side of the external device 301, communicates data necessary for learning to the external device 301, and executes learning only on the external device side. In this case, as described above in <Learning Performed When Parameter Is Changed by Communication Device>, learning may be performed by setting the parameters such as the weight of the neural network learned on the external device side to the image capturing apparatus 101 by communication.

Additionally, the learning processing may be provided in both the image capturing apparatus 101 and the external device 301. For example, learning may be performed by communicating learning information held in the external device 301 to the image capturing apparatus 101 at the timing of performing the learning mode processing 716 in the image capturing apparatus 101 and merging the learning parameters.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-250103, filed Dec. 26, 2017, and 2018-203254, filed Oct. 29, 2018, which are hereby incorporated by reference herein in their entirety.

What is claimed is:

1. An image processing method comprising:
performing processing of selecting a learning model from a plurality of learning models that have learned a reference used to record an image generated by an image sensor;
performing, using the selected learning model, determination processing of determining whether the image generated by the image sensor satisfies the reference; and
recording the image generated by the image sensor in a memory in a case in which it is determined in the determination processing that the image generated by the image sensor satisfies the reference,
wherein the processing of selecting the learning model is performed based on at least one of an image capturing instruction by a user, an evaluation result of the image by the user, an environment when the image is generated by the image sensor, and a score of each of the plurality of learning models for the image generated by the image sensor, and
wherein the processing of selecting the learning model is performed by changing at least one of a number of nodes in an input layer, a number of nodes an intermediate layer, a number of nodes an output layer, a feature amount represented by a node, an activation function of a node, a weight coefficient of a bond that connects nodes, and a number of layers in the intermediate layer.

2. The method according to claim 1, wherein the processing of selecting the learning model is performed based on an image generated in accordance with the image capturing instruction by the user.

3. The method according to claim 2, wherein the processing of selecting the learning model is performed based on a result obtained by analyzing the image generated in accordance with the image capturing instruction by the user.

4. The method according to claim 3, wherein
the plurality of learning models correspond to different scenes, respectively, and
in the processing of selecting the learning model, a learning model corresponding to a scene of the image generated in accordance with the image capturing instruction by the user is selected.

5. The method according to claim 1, wherein the processing of selecting the learning model is performed based on an analysis result of an image generated before the image generated in accordance with the image capturing instruction by the user in a case in which the image capturing instruction by the user exists.

6. The method according to claim 5, wherein
the plurality of learning models correspond to different scenes, respectively, and
in the processing of selecting the learning model, a learning model corresponding to a scene of the image generated before the image generated in accordance with the image capturing instruction by the user is selected.

7. The method according to claim 1, wherein
the plurality of learning models correspond to different scenes, respectively, and
in the processing of selecting the learning model, a learning model corresponding to a scene of an image to which an evaluation point satisfying a predetermined condition is given by the user is selected.

8. The method according to claim 7, wherein the processing of selecting the learning model is performed based on information representing a place when the image is generated by the image sensor.

9. The method according to claim 8, wherein
the plurality of learning models correspond to different places, respectively, and
in the processing of selecting the learning model, a learning model corresponding to the place when the image is generated by the image sensor is selected.

10. The method according to claim 1, wherein
the score of each of the plurality of learning models for the image generated by the image sensor is calculated using the plurality of learning models, and
a learning model is selected from the plurality of learning models based on the scores of the plurality of learning models.

11. The method according to claim 1, wherein
the score for the image generated in accordance with the image capturing instruction by the user is calculated using the plurality of learning models, and
the processing of selecting the learning model is performed based on the scores of the plurality of learning models.

12. The method according to claim 11, wherein in the processing of selecting the learning model, a learning model having a smallest difference from a supervised value corresponding to the image generated in accordance with the image capturing instruction by the user is selected.

13. An image processing method comprising:
performing processing of selecting a learning model from a plurality of learning models that have learned a reference used to record an image generated by an image sensor;

performing, using the selected learning model, determination processing of determining whether the image generated by the image sensor satisfies the reference; and recording the image generated by the image sensor in a memory in a case in which it is determined in the determination processing that the image generated by the image sensor satisfies the reference, wherein the processing of selecting the learning model is performed based on at least one of an image capturing instruction by a user, an evaluation result of the image by the user, an environment when the image is generated by the image sensor, and a score of each of the plurality of learning models for the image generated by the image sensor, and wherein a long-term learning model is provided in addition to the plurality of learning models, and an acquisition period of supervised data used for learning of the long-term learning model is longer than an acquisition period of supervised data used for learning of each of the plurality of learning models.

14. The method according to claim 13, wherein the determination processing is performed based on a result obtained by integrating a score of the long-term learning model for the image generated by the image sensor and a score of the selected learning model for the image generated by the image sensor.

15. An image processing method comprising:

performing processing of selecting a learning model from a plurality of learning models that have learned a reference used to record an image generated by an image sensor;

performing, using the selected learning model, determination processing of determining whether the image generated by the image sensor satisfies the reference;

recording the image generated by the image sensor in a memory in a case in which it is determined in the determination processing that the image generated by the image sensor satisfies the reference, and adding a new learning model in a case in which a predetermined number of supervised data each having a feature different from that of supervised data used for learning of the plurality of learning models are obtained, wherein the processing of selecting the learning model is performed based on at least one of an image capturing instruction by a user, an evaluation result of the image by the user, an environment when the image is generated by the image sensor, and a score of each of the plurality of learning models for the image generated by the image sensor.

16. A non-transitory storage medium storing a program configured to cause a computer to execute each step of an image processing method, the image processing method comprising:

performing processing of selecting a learning model from a plurality of learning models that have learned a reference used to record an image generated by an image sensor;

performing, using the selected learning model, determination processing of determining whether the image generated by the image sensor satisfies the reference; and recording the image generated by the image sensor in a memory in a case in which it is determined in the determination processing that the image generated by the image sensor satisfies the reference, wherein the processing of selecting the learning model is performed based on at least one of an image capturing instruction by a user, an evaluation result of the image by the user, an environment when the image is generated by the image sensor, and a score of each of the plurality of learning models for the image generated by the image sensor, and wherein the processing of selecting the learning model is performed by changing at least one of a number of nodes in an input layer, a number of nodes in an intermediate layer, a number of nodes in an output layer, a feature amount represented by a node, an activation function of a node, a weight coefficient of a bond that connects nodes, and a number of layers in the intermediate layer.

17. An image processing apparatus comprising:

a processor; and a memory including instructions that, when executed by the processor, cause the processor to:

select a learning model from a plurality of learning models that have learned a reference used to record an image generated by an image sensor;

perform, using the selected learning model, determination processing of determining whether the image generated by the image sensor satisfies the reference; and record the image generated by the image sensor in a memory in a case in which it is determined in the determination processing that the image generated by the image sensor satisfies the reference, wherein the processor selects the learning model from the plurality of learning models based on at least one of an image capturing instruction by a user, an evaluation result of the image by the user, an environment when the image is generated by the image sensor, and a score of each of the plurality of learning models for the image generated by the image sensor, and wherein the processing of selecting the learning model is performed by changing at least one of a number of nodes in an input layer, a number of nodes in an intermediate layer, a number of nodes in an output layer, a feature amount represented by a node, an activation function of a node, a weight coefficient of a bond that connects nodes, and a number of layers in the intermediate layer.

18. An image capturing apparatus comprising:

an image sensor;

a processor; and a memory including instructions that, when executed by the processor, cause the processor to:

select a learning model from a plurality of learning models that have learned a reference used to record an image generated by the image sensor;

perform, using the selected learning model, determination processing of determining whether the image generated by the image sensor satisfies the reference; and record the image generated by the image sensor in a memory in a case in which it is determined in the determination processing that the image generated by the image sensor satisfies the reference, wherein the processor selects the learning model from the plurality of learning models based on at least one of an image capturing instruction by a user, an evaluation result of the image by the user, an environment when the image is generated by the image sensor, and a score of each of the plurality of learning models for the image generated by the image sensor, and wherein the processing of selecting the learning model is performed by changing at least one of a number of nodes in an input layer, a number of nodes in an intermediate layer, a number of nodes in an output layer, a feature amount represented by a node, an activation function of a node, a weight coefficient of a bond that connects nodes, and a number of layers in the intermediate layer.

* * * * *